(12) United States Patent
Dai

(10) Patent No.: US 8,396,298 B2
(45) Date of Patent: Mar. 12, 2013

(54) IMAGE PROCESSING APPARATUS, IMAGE PROCESSING METHOD, AND STORAGE MEDIUM WITH VECTORIZATION PROCESS FOR DATA FROM GRAPHIC AREAS

(75) Inventor: Xiaoyan Dai, Yokohama (JP)

(73) Assignee: Canon Kabushiki Kaisha (JP)

( * ) Notice: Subject to any disclaimer, the term of this patent is extended or adjusted under 35 U.S.C. 154(b) by 911 days.

(21) Appl. No.: 12/474,082

(22) Filed: May 28, 2009

(65) Prior Publication Data

US 2009/0297024 A1    Dec. 3, 2009

(30) Foreign Application Priority Data

May 30, 2008   (JP) ................................. 2008-143617

(51) Int. Cl.
*G06K 9/48* (2006.01)

(52) U.S. Cl. ........ 382/199; 382/162; 345/421; 345/533; 358/540

(58) Field of Classification Search .................. 382/162, 382/165, 190, 199; 345/421, 533; 358/540
See application file for complete search history.

(56) References Cited

U.S. PATENT DOCUMENTS

| 4,759,075 | A | * | 7/1988 | Lipkie et al. .................. | 382/288 |
| 4,817,187 | A | * | 3/1989 | Lien ............... | 382/253 |
| 5,680,478 | A | | 10/1997 | Wang et al. | |
| 5,757,961 | A | | 5/1998 | Yamakawa et al. | |
| 5,878,161 | A | | 3/1999 | Ishida et al. | |
| 2003/0142344 | A1 | * | 7/2003 | Geske et al. ................ | 358/1.15 |
| 2004/0061883 | A1 | * | 4/2004 | Kanatsu ........................ | 358/1.9 |
| 2004/0223197 | A1 | * | 11/2004 | Ohta et al. ..................... | 358/538 |
| 2006/0045386 | A1 | | 3/2006 | Fukuoka et al. | |
| 2006/0062476 | A1 | | 3/2006 | Yamada | |
| 2007/0025617 | A1 | | 2/2007 | Dai et al. | |
| 2008/0123946 | A1 | | 5/2008 | Kiuchi et al. | |
| 2008/0137961 | A1 | | 6/2008 | Ishida et al. | |

FOREIGN PATENT DOCUMENTS

| JP | 2885999 B2 | 2/1999 |
| JP | 11-69145 A | 3/1999 |
| JP | 3049672 B2 | 3/2000 |
| JP | 2004-265384 A | 9/2004 |
| JP | 2005-031818 A | 2/2005 |
| JP | 2005-190010 A | 7/2005 |
| JP | 2006-093810 A | 4/2006 |
| JP | 2006-270589 A | 10/2006 |
| JP | 2006-344069 A | 12/2006 |

(Continued)

OTHER PUBLICATIONS

Office Action issued Mar. 9, 2012 for corresponding JP 2008-143617.

*Primary Examiner* — Chan S Park
*Assistant Examiner* — Eueng-Nan Yeh
(74) *Attorney, Agent, or Firm* — Rossi, Kimms & McDowell LLP

(57) ABSTRACT

An image processing apparatus includes a separation unit which determines the attribute of data contained in input document image data and separates the document image data into areas by attributes, an extraction unit which extracts, from the separated areas, an area of a graphics image as a target of vectorization processing, a determination unit which determines whether the attribute of the area of the graphics image is a clipart area or a line drawing area including a line drawing, and a vector conversion unit which performs vectorization processing corresponding to the attribute of the graphics image based on the determination result of the determination unit.

15 Claims, 16 Drawing Sheets

FOREIGN PATENT DOCUMENTS

| JP | 2007-158725 A | 6/2007 |
| JP | 2007-280041 A | 10/2007 |
| JP | 2008-015706 A | 1/2008 |
| JP | 2008-146496 A | 6/2008 |

* cited by examiner

FIG. 12
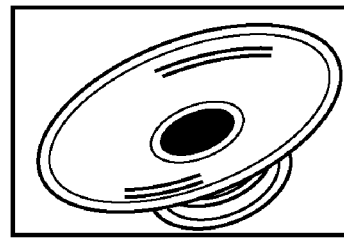
ORIGINAL IMAGE
(BROWN LINE DRAWING)
1100
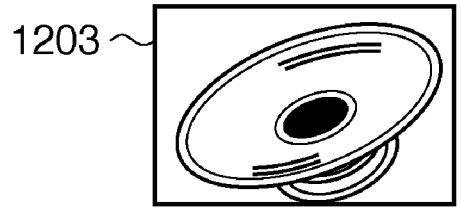
1203
BROWN
AREA
1204
BACKGROUND
AREA

IMAGE PROCESSING APPARATUS, IMAGE PROCESSING METHOD, AND STORAGE MEDIUM WITH VECTORIZATION PROCESS FOR DATA FROM GRAPHIC AREAS

BACKGROUND OF THE INVENTION

1. Field of the Invention

The present invention relates to an image processing technique.

2. Description of the Related Art

Recent progress of information digitization is spreading to systems that scan paper documents using a scanner or the like, and store the electronic data or send them to another apparatus, instead of storing a paper document as it is. These systems are required to have high compressibility of digitized documents to reduce the sending cost. Compressing electronic data requires high reusability to partially edit electronic data and high image quality to prevent any degradation in image quality in both enlargement and reduction.

However, if document data containing both a text area and a photo area undergoes compression suitable for the text area, the compression ratio is low although the image quality is high. To the contrary, if the data undergoes compression suitable for the photo area, the quality of characters degrades although the compression ratio is high. A method has been proposed to solve this problem. First, digitized document data (document image) is separated into a text area and a photo area. The text area that makes much account of usability and image quality is converted into vector data. The remaining areas such as the photo area which cannot easily be reproduced by vectorization are compressed by JPEG. The compression results of the respective areas are combined and output, thereby obtaining a document image with high compressibility, reusability, and image quality (Japanese Patent Laid-Open No. 2004-265384).

Conventionally, a means for vectorizing an image (to be referred to as a "line drawing image" hereinafter) including many lines separated from a document image has been proposed (Japanese Patent No. 3049672). There are proposed, for example, an outline vector method of binarizing an image and approximating coarse contours extracted from closed lines in the binary image, and a line art method of approximating the cores of closed lines.

Another method has been proposed which enlarges a vectorization target to improve the compressibility, reusability, and image quality of the document image (Japanese Patent Laid-Open No. 2006-344069). Still another proposed method vectorizes, in an image conventionally compressed as a photo by JPEG, a specific image (illustration) (to be referred to as a "clipart image" hereinafter) which is clear as it if had edges on the contours of an object and has only a limited number of appearing colors. The method proposed here divides an image into color areas based on the color similarity, approximates the contour of each color area by the outline method, adds color information, and outputs vector data.

However, when vectorizing image data, whether an input image is a clipart image or a line drawing image is determined so far based on the experiences of a developer, and the vectorization method to apply is thus switched. The conventional technique cannot automatically switch the vectorization method by automatically determining whether an input image is a clipart or a line drawing. Concerning a means for separating a document image into attribute areas such as a text area and a photo area, there are proposed many methods of determining whether a pixel is a text pixel or a photo pixel. However, these methods do not determine whether an overall document image to be processed is a clipart or a line drawing.

Various proposals have also been made regarding binary line drawing vectorization processing. For, for example, color line drawing vectorization processing, a method has been proposed which generates three single-color multilevel images of an input image, extracts the shapes of isodensity lines of each multilevel image, and vectorizes them (Japanese Patent Laid-Open No. 11-069145).

However, generation of single-color multilevel images of a color line drawing is largely affected by thresholds, and the method cannot deal with scan noise well.

SUMMARY OF THE INVENTION

The present invention provides an image processing technique of automatically determining a clipart and a line drawing in an area containing a mixture of a clipart and a line drawing and automatically switching the vectorization method in accordance with the type (attribute) of the image.

The present invention provides an image processing method and image processing apparatus for dividing a color line drawing into color areas, and combining the vectorization results of the respective color areas, thereby generating vector data.

According to one aspect of the present invention, there is provided an image processing apparatus comprising: a separation unit adapted to determine an attribute of data contained in input document image data and separating the document image data into areas by attributes; an extraction unit adapted to extract, from the separated areas, an area of a graphics image as a target of vectorization processing; a determination unit adapted to determine whether an attribute of the area of the graphics image is a clipart area or a line drawing area including a line drawing; and a vector conversion unit adapted to perform vectorization processing corresponding to the attribute of the graphics image based on a determination result of the determination unit.

According to another aspect of the present invention, there is provided an image processing apparatus comprising: an extraction unit adapted to extract a line drawing area from a document image; a clustering processing unit adapted to separate the line drawing area into a plurality of clusters based on color features of pixels of the line drawing area; a cluster integration unit adapted to integrate similar clusters based on similarities of color features of the plurality of clusters; a labeling processing unit adapted to obtain the number of connected areas included in each cluster integrated by the cluster integration unit; a reintegration process target determination unit adapted to determine, as a reintegration target cluster that requires further integration, a cluster in which the number of connected areas is not less than a predetermined threshold, and the number of pixels is smaller than a predetermined threshold; a main color area determination unit adapted to determine, as a main color cluster, a cluster in which the number of pixels is not less than a predetermined threshold; a reintegration unit adapted to integrate the reintegration target cluster with one of the main color clusters based on the color feature of each cluster; and a line drawing area vector conversion unit adapted to perform vectorization processing based on the cluster integrated by the reintegration unit.

According to still another aspect of the present invention, there is provided an image processing method of an image processing apparatus, comprising the steps of: determining an attribute of data contained in input document image data and separating the document image data into areas corresponding to attributes; extracting, from each of the separated areas, an area of a graphics image as a target of vectorization processing; determining whether an attribute of the area of the graphics image is a clipart area or a line drawing area including a line drawing; and performing vectorization processing corresponding to the attribute of the graphics image based on a determination result in the determining step.

According to yet another aspect of the present invention, there is provided an image processing method of an image processing apparatus, comprising the steps of: extracting a line drawing area from a document image; separating the line drawing area into a plurality of clusters based on color features of pixels of the line drawing area; integrating similar clusters based on similarities of color features of the plurality of clusters; obtaining the number of connected areas included in each cluster integrated in the integrating step; determining, as a reintegration target cluster that requires further integration, a cluster in which the number of connected areas is not less than a predetermined threshold, and the number of pixels is smaller than a predetermined threshold; determining, as a main color cluster, a cluster in which the number of pixels is not less than a predetermined threshold; integrating the reintegration target cluster with one of the main color clusters based on the color feature of each cluster; and performing vectorization processing based on the cluster integrated in the step of integrating the reintegration target cluster.

According to the present invention, it is possible to automatically determine a clipart image and a line drawing image and automatically switch the vectorization method in accordance with the attribute of the image.

The automatic vectorization method switching improves the process efficiency and image quality of a document image.

It is possible to execute color separation processing suitable for the feature of a color line drawing and thus improve the vectorization result of the color line drawing. This improves the compressibility and reusability of a document image.

Further features of the present invention will become apparent from the following description of exemplary embodiments with reference to the attached drawings.

BRIEF DESCRIPTION OF THE DRAWINGS

FIG. 12 is a view showing an example of the line drawing area color separation processing (after the reintegration process target area reprocessing);

DESCRIPTION OF THE EMBODIMENTS

Automatic vectorization switching processing by automatic clipart area/line drawing area determination, and color separation processing for color line drawing vectorization processing using an image processing apparatus according to the present invention will now be described in detail with reference to the accompanying drawings. Note that the constituent elements described in the embodiments are merely examples. The technical scope of the present invention is determined by the scope of claims and is not limited by the following individual embodiments.

First Embodiment (Apparatus Arrangement)

Figure 1:
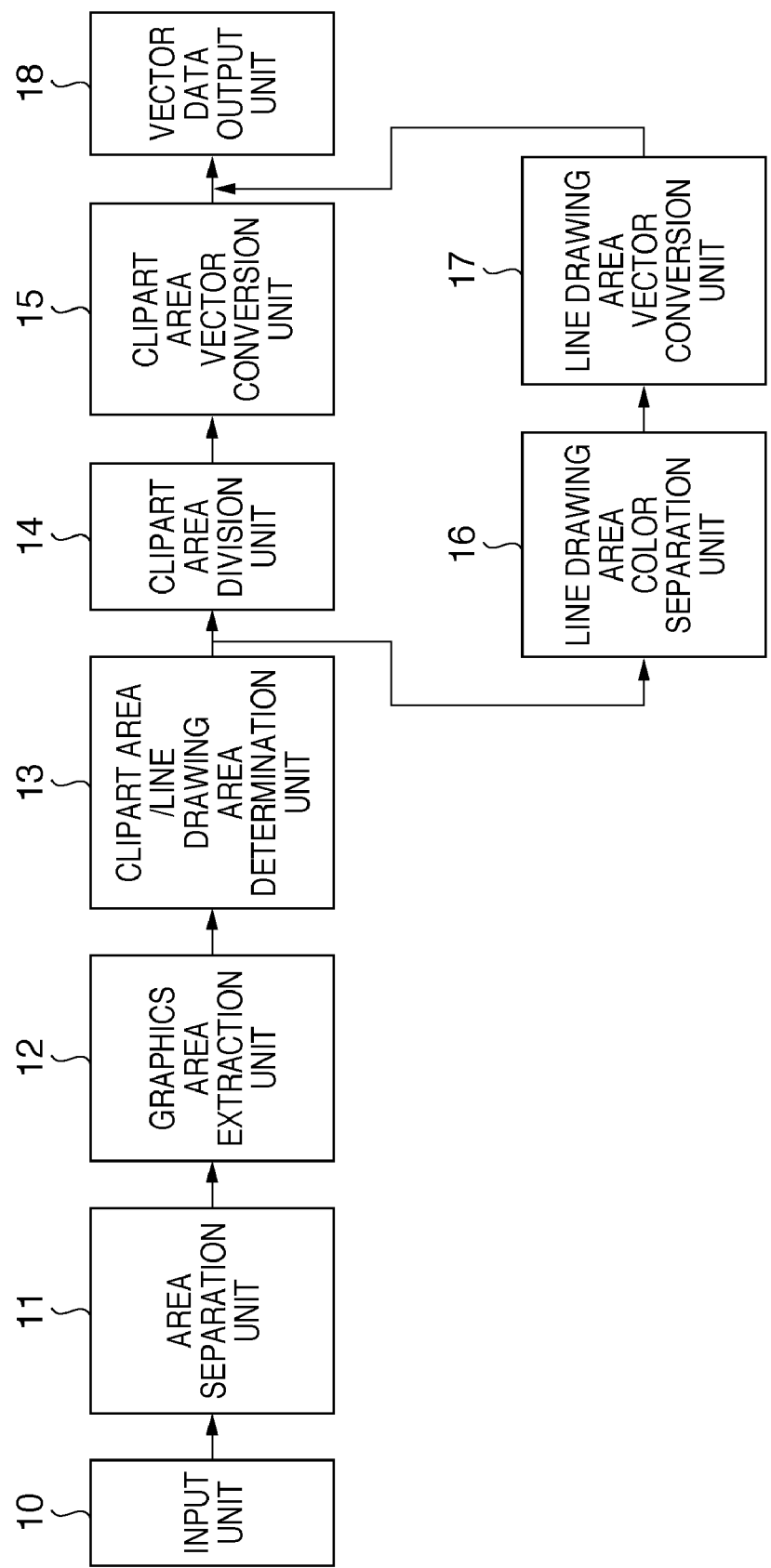
FIG. 1 is a block diagram showing the functional arrangement of an image processing apparatus according to the first embodiment of the present invention.

FIG. 1 is a block diagram showing the arrangement of an image processing apparatus according to the first embodiment of the present invention. The image forming apparatus has functions of performing automatic vectorization switching processing by automatic clipart area/line drawing area determination, and performing color separation processing for color line drawing vectorization processing.

Referring to FIG. 1, an input unit 10 receives monochrome or color image data input from paper information via an image reading means such as a scanner. An area separation unit 11 separates the color image into a plurality of kinds of areas including text and photo areas. A graphics area extraction unit 12 extracts, from the separated areas, graphics areas having attributes other than text and photo attributes. A clipart area/line drawing area determination unit 13 determines clipart areas and line drawing areas included in the graphics areas. Note that in this embodiment, a clipart indicates an image like a simple illustration including only a limited number of appearing colors, unlike a complex image such as a photo or a natural image having an enormous number of colors. A clipart area division unit 14 divides pixels in a clipart area into areas based on color features. A clipart area vector conversion unit 15 converts the clipart area division result into vector data. A line drawing area color separation unit 16 separates a color line drawing area into color components. A line drawing area vector conversion unit 17 converts the line drawing area color separation result into vector data. A vector data output unit 18 can output the process result of the clipart area vector conversion unit 15 and that of the line drawing area vector conversion unit 17.

Figure 2:
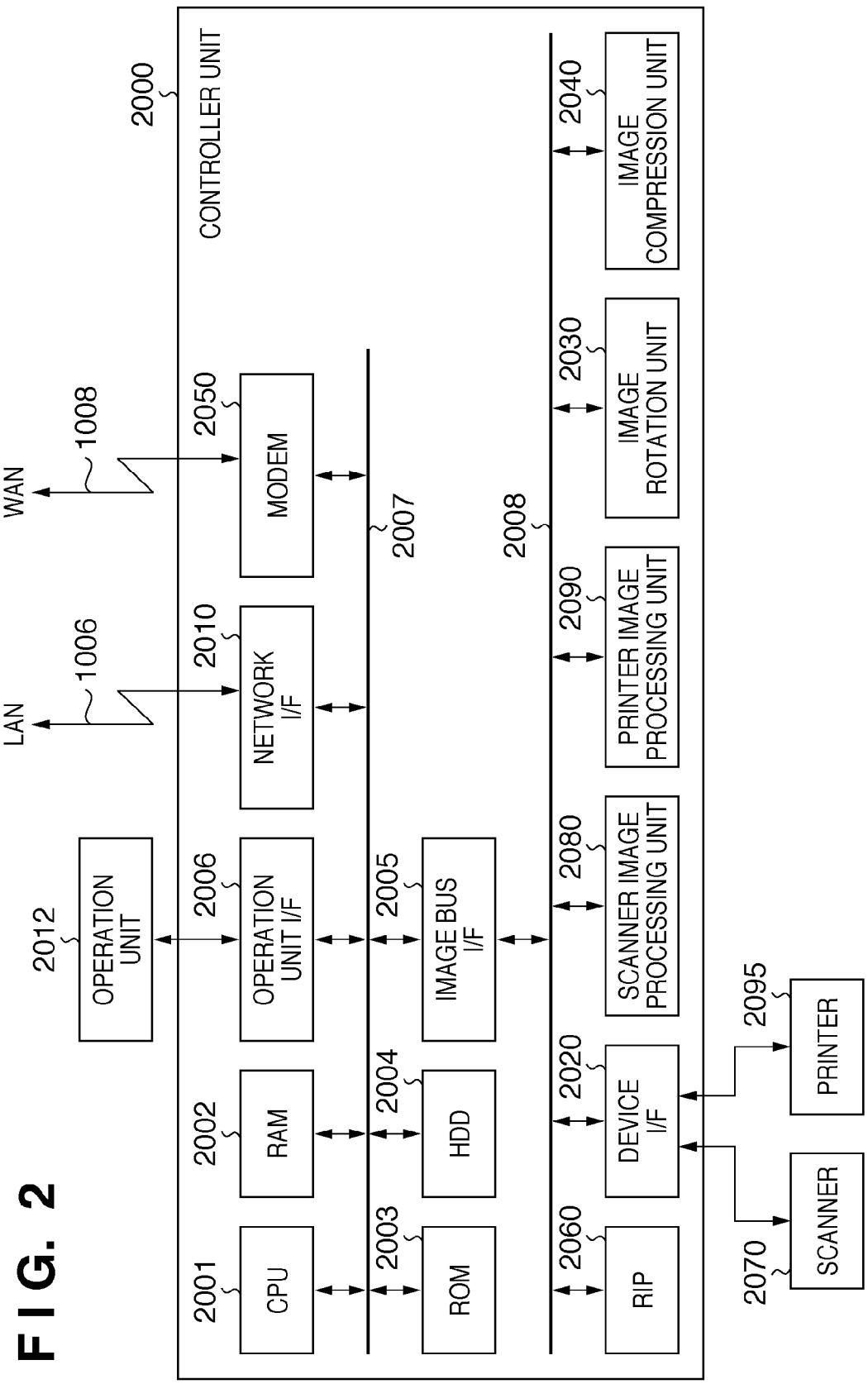
FIG. 2 is a block diagram showing the arrangement of the main part of a digital multifunction peripheral (MFP) that implements the image processing apparatus shown in FIG. 1.

FIG. 2 is a block diagram showing the arrangement of the main part of a digital multifunction peripheral (MFP) as an embodiment that implements the image processing apparatus shown in FIG. 1. In this embodiment, a digital multifunction peripheral (MFP) having a scanner function and a printer function is used as the image processing apparatus. However, a system formed by connecting a general-purpose scanner and a personal computer may be used as the image processing apparatus.

As shown in FIG. 2, the MFP includes a controller unit 2000 that functions as the control means of the image processing apparatus. The controller unit 2000 is connected to a scanner 2070 serving as an image input device and a printer 2095 serving as an image output device via a device interface (I/F). The controller unit 2000 can control to implement a copy function of causing the printer 2095 to print image data read from a document image by the scanner 2070. The controller unit 2000 can also control to receive/output a pattern image or device information from/to another apparatus via a LAN 1006 or a public network (WAN) 1008.

As shown in FIG. 2, the controller unit 2000 has a CPU 2001. The CPU 2001 starts up the operating system (OS) based on a boot program stored in a ROM 2003. The CPU 2001 executes, on the OS, application programs stored in an HDD (Hard Disk Drive) 2004, thereby executing various kinds of processing. The CPU 2001 uses a RAM 2002 as the work area. The RAM 2002 provides not only the work area of the CPU 2001 but also an image memory area to temporarily store image data. The HDD 2004 stores image data together with the application programs.

The ROM 2003 and the RAM 2002 are connected to the CPU 2001 via a system bus 2007. An operation unit I/F (interface) 2006, network I/F (interface) 2010, modem 2050, and image bus I/F (interface) 2005 are connected to the CPU 2001.

The operation unit I/F 2006 is an interface to an operation unit 2012 having a touch panel, and outputs, to the operation unit 2012, image data to be displayed on it. The operation unit I/F 2006 also sends, to the CPU 2001, information input by the user via the operation unit 2012.

The network I/F 2010 is connected to the LAN 1006 to receive/output information to each device connected to the LAN 1006 via it. The modem 2050 is connected to the public network 1008 to receive/output information to another device via the public network 1008.

The image bus I/F 2005 is a bus bridge which connects the system bus 2007 to an image bus 2008 for transferring image data at high speed to convert the data structure. The image bus 2008 is formed from a PCI bus or IEEE1394. A raster image processor (RIP) 2060, device I/F 2020, scanner image processing unit 2080, printer image processing unit 2090, image rotation unit 2030, thumbnail creation unit 2035, and image compression unit 2040 are provided on the image bus 2008.

The RIP 2060 is a processor to rasterize a PDL code into a bitmap image. The device I/F 2020 is connected to the scanner 2070 and the printer 2095 to perform conversion between synchronous and asynchronous systems. The scanner image processing unit 2080 corrects, manipulates, and edits input image data. The printer image processing unit 2090 performs printer correction and resolution conversion for print output image data. The image rotation unit 2030 rotates image data. The image compression unit 2040 compresses multilevel image data into JPEG data, and binary image data into JBIG, MMR, or MH data, and also decompresses the data.

<Outline of Automatic Vectorization Switching Processing by Automatic Clipart Area/Line Drawing Area Determination>

Figure 3:
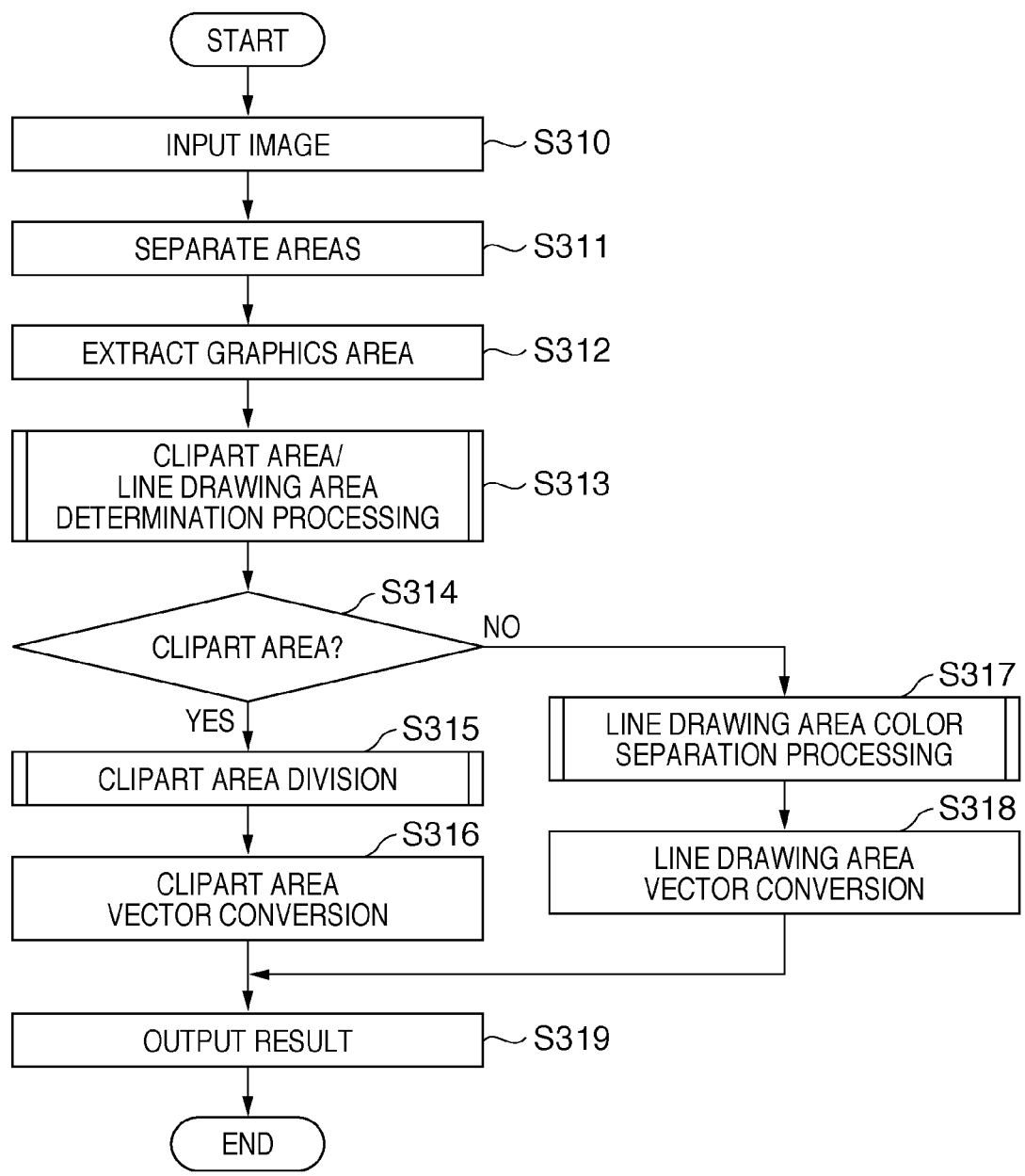
FIG. 3 is a flowchart for explaining an outline of automatic vectorization switching processing by automatic clipart area/line drawing area determination.

FIG. 3 is a flowchart for explaining an outline of automatic vectorization switching processing by automatic clipart area/line drawing area determination according to the first embodiment.

First, the input unit 10 receives paper information from a scanner, thereby obtaining color document image data (step S310). The area separation unit 11 converts the received color document image into binary data, and separates the binary image data into a plurality of kinds of areas such as text, photo, and table areas (step S311). The area separation processing can be implemented using, for example, an area separation technique described in U.S. Pat. No. 5,680,478. Note that this patent describes "Method and Apparatus for Character Recognition (Shin-Ywan Wang et al./Canon K. K.)". The graphics area extraction unit 12 selects, from the areas separated in the preceding step, a graphics area having an attribute other than text, photo, and table attributes, that is, an area including a clipart area or a line drawing area as a process target (step S312).

The clipart area/line drawing area determination unit 13 determines whether the graphics area extracted in the preceding step (step S312) is a clipart area or a line drawing area (step S313).

Upon determining that the graphics area is a clipart area (YES in step S314), the clipart area division unit 14 divides the pixels into several clusters (areas) based on color features. The area division processing will be described later in detail (step S315). The clipart area vector conversion unit 15 converts each divided area into vector data based on the contour and the color in the area (step S316). The vectorization processing is implemented by, for example, extracting the boundary line of each color area, tracking the contour of each boundary line, and selecting its coordinate vector. Note that when a clipart image is divided into clusters of colors (color areas) and vectorized based on the outline (contour) of each cluster, the boundary lines between clusters, that is, clusters which are adjacent to each other may overlap or form a gap between them. The present applicant has proposed a method in Japanese Patent Laid-Open No. 2008-146496, in which the intersections between boundaries of color areas are identified. While defining the identified intersections as end points, a vector between the end points is generated for each boundary that connects the end points. The vectors between the end points are connected, thereby generating vector data of each area. That is, the vectorization processing executed in step S316 can use a method of vectorizing boundary lines using the same approximation to prevent any gap or overlap between color areas which are adjacent to each other.

Upon determining that the graphics area is a line drawing area (NO in step S314), the line drawing area color separation unit 16 separates the line drawing area into color areas based on information such as the color features of pixels and connection of the areas. The line drawing area color separation processing will be described later in detail (step S317). The line drawing area vector conversion unit 17 converts each separated color area into vector data (step S318). The vectorization processing is implemented using, for example, a technique described in Japanese Patent No. 2885999 which tracks the contour of a binary image and selects its coordinate vector.

Then, the vector data output unit 18 outputs the vectorization result (step S319).

<Example of Graphics Area Extraction>

Figure 4:
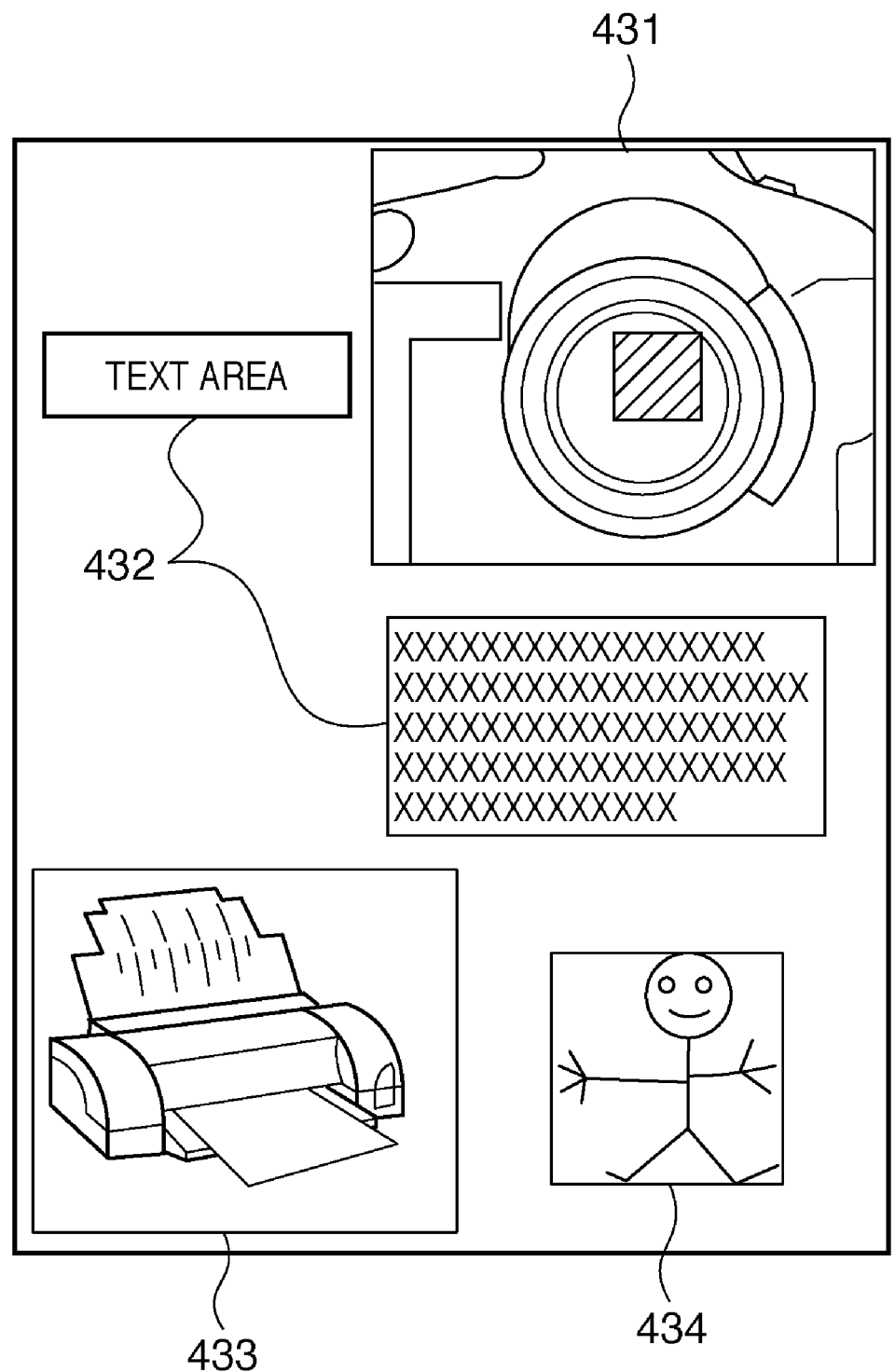
FIG. 4 is a view showing an example in which graphics areas including a clipart area and a line drawing area are separated from a result of area separation of an input image.

FIG. 4 is a view showing an example in which graphics areas including a clipart area and a line drawing area are selected from an image in the image processing according to the first embodiment. In the document image shown in FIG. 4, a photo area 431, text areas 432, and graphics areas 433 and 434 including a clipart area and a line drawing area are separated as rectangular areas by the above-described area separation method.

<Clipart Area/Line Drawing Area Determination Processing (S313)>

Figure 5:
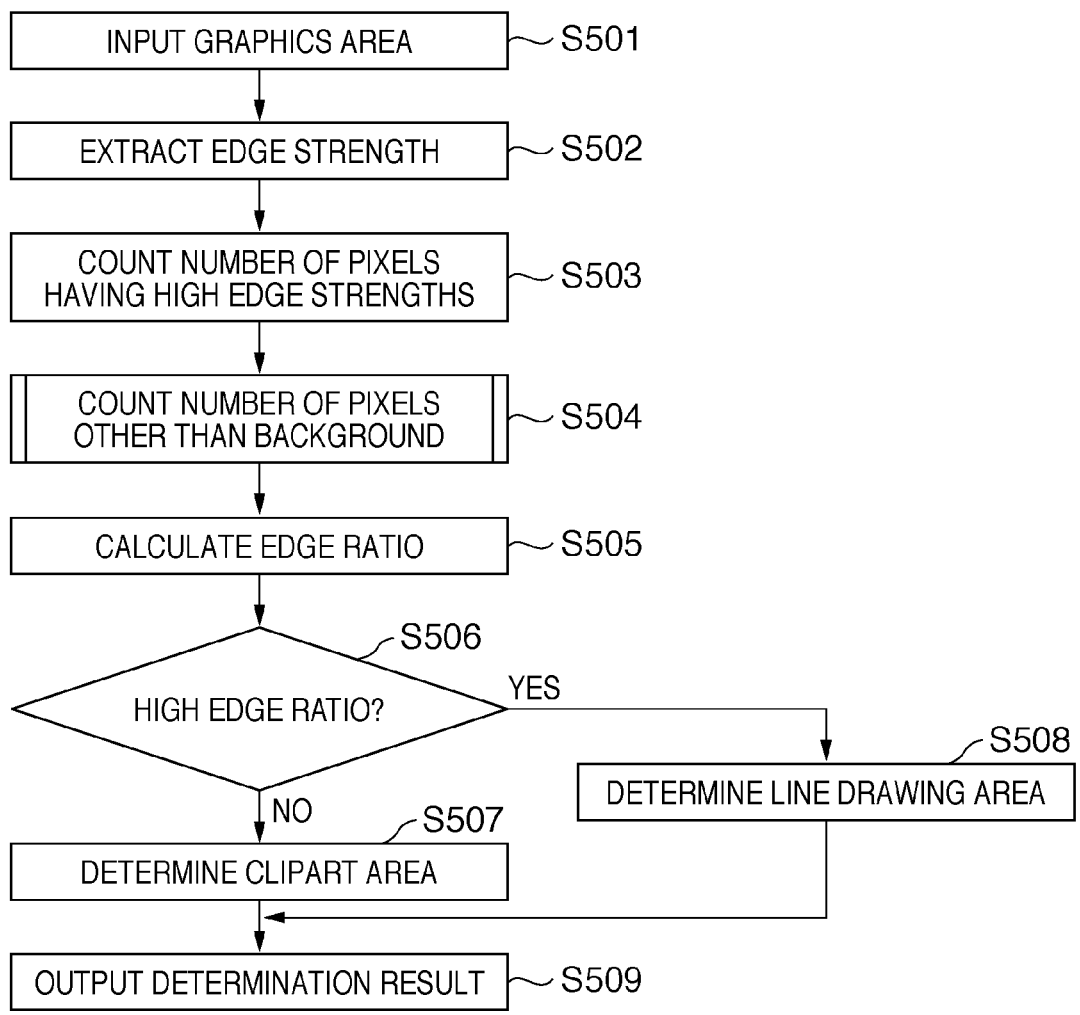
FIG. 5 is a flowchart for explaining clipart area/line drawing area determination processing.

Details of the processing of determining a clipart area and a line drawing area included in graphics areas (S313) will be described with reference to FIG. 5.

In step S501, a graphics image as a process target is input. In step S502 or an edge extraction step, an edge strength is extracted from the graphics image. To extract an edge, a known Prewitt filter or Sobel filter is usable. That is, a differential image representing an edge strength is generated. In step S503 or an edge pixel count step, the number of pixels having edge strengths higher than a predetermined threshold is counted based on the extracted edge strength as the number of pixels of the edge.

In step S504 or a pixel-except-background count step, the number of pixels other than the background is counted. Counting the number of pixels other than the background (statistical processing) will be described later in detail. In step S505 or an edge ratio calculation step, the ratio (edge ratio) of the number of pixels having higher edge strengths obtained in step S503 to the number of pixels other than the background obtained in step S504 is calculated.

In steps S506, S507, and S508, a clipart area or a line drawing area is determined. In step S506, if the edge ratio obtained in step S505 is higher than a predetermined threshold (YES in step S506), the input graphics image is determined to be a line drawing in step S508. On the other hand, if the edge ratio is equal to or lower than the predetermined threshold (NO in step S506), the input graphics image is determined to be a clipart in step S507. In step S509, the clipart area or line drawing area determination result is output.

<Statistical Processing of Counting Number of Pixels Other Than Background (S504)>

Most clipart areas are fundamentally solid areas. On the other hand, line drawing areas include many lines. Using these features, the ratio of the number of pixels having high edge strengths to the number of pixels other than the background is obtained as the edge ratio to be used to for clipart area/line drawing area determination. If the ratio of the number of pixels having high edge strengths to the number of pixels of an entire image is obtained, the influence of the background portion is large. To prevent this, the edge ratio is obtained.

Figure 6:
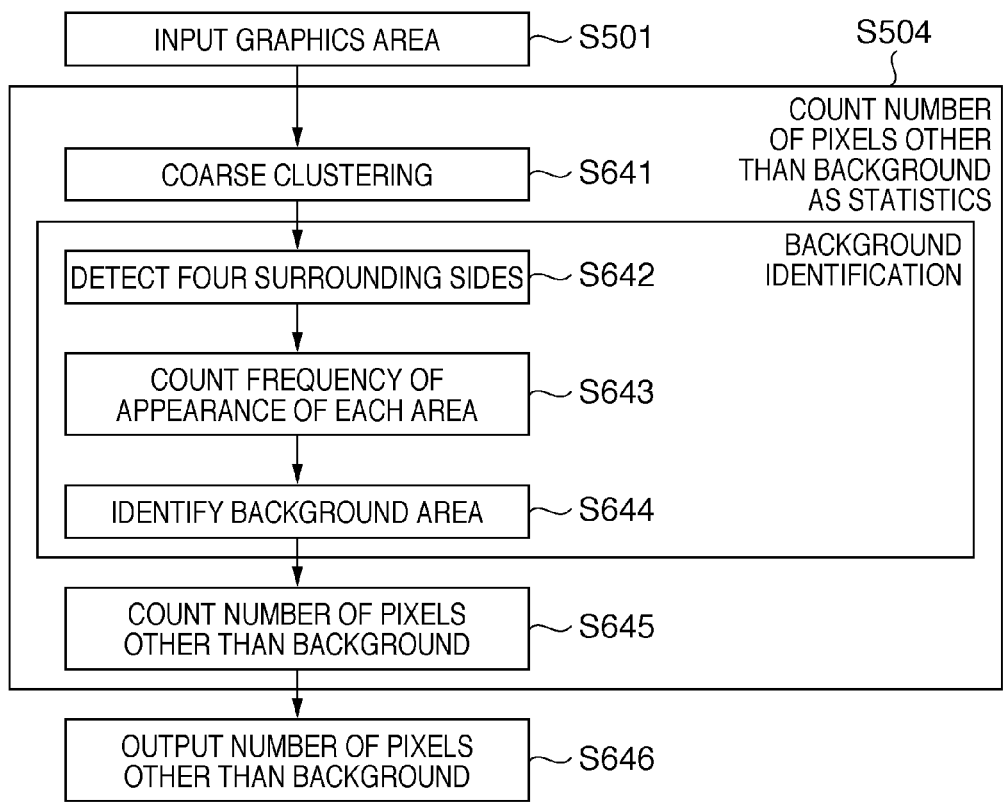
FIG. 6 is a flowchart for explaining statistical processing of counting the number of pixels other than the background which are used in the clipart area/line drawing area determination processing.

Details of the statistical processing of counting the number of pixels other than the background (S504) will be described with reference to FIG. 6. In step S501, a graphics area as a process target is input. In step S641, the graphics image of the process target undergoes coarse clustering processing. This processing divides the image into color clusters using the color features (including color information such as chroma and density of each pixel) of the image, that is, based on the similarities of the color features of the image (pixels). In step S642, four surrounding sides are detected based on the result of coarse clustering processing. In step S643, the frequency of appearance of each cluster is counted (counted as statistics) based on the cluster information (e.g., including the color information of each pixel) of the pixels of the four surrounding sides. In step S644, out of the clusters, a cluster having the highest frequency of appearance is identified as the background. In step S645, the number of pixels included in areas other than the identified background is counted (counted as statistics). In step S646, the counted (counted as statistics) number of pixels other than the background is output.

<Example of Background Area Identification Processing (S644)>

Figure 7:
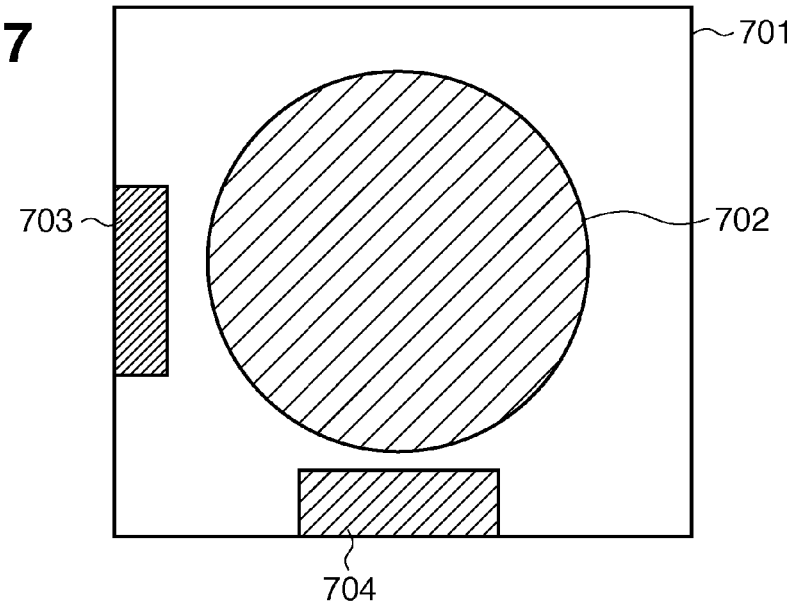
FIG. 7 is a view showing an example of background area identification processing used in the clipart area/line drawing area determination processing.

A detailed example of the background area identification processing in step S644 will be described. FIG. 7 is a view for explaining background area identification in a graphics area in the image processing according to the first embodiment. The graphics area is divided into four areas, that is, a green cluster 701, yellow cluster 702, blue cluster 703, and violet cluster 704 by coarse clustering processing. In the background identification processing, the green cluster 701 is determined to have the highest frequency of appearance based on the cluster information of each pixel of the four surrounding sides of the rectangular area of the graphics image. For this reason, the green cluster 701 is identified as the background area.

<Clipart Area Division Processing (S315)>

Figure 8:
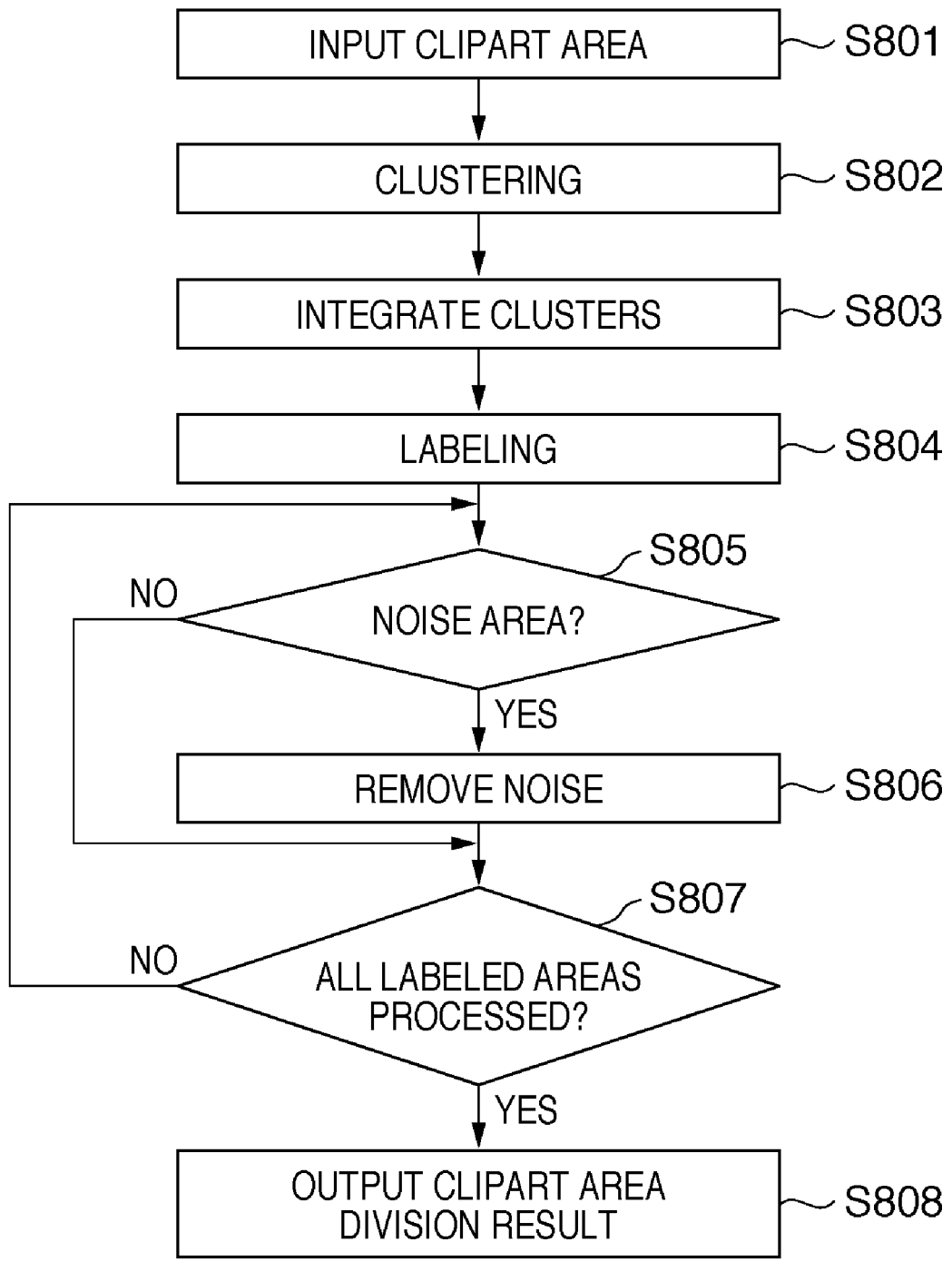
FIG. 8 is a flowchart for explaining clipart area division processing.

Details of the clipart area division processing (S315) will be described with reference to FIG. 8. In step S801, a clipart image as a process target is input. In step S802, clustering processing is performed based on the color feature amount of each pixel. In this processing, first, the first cluster is generated based on the start pixel of raster scan. The similarities between the next pixel and all clusters are obtained. The higher the similarity is, the closer the features of the pixel and cluster are supposed to be. RGB values are used to calculate the similarity. Information of any other color space or information except color information is also usable as a feature amount. The highest similarity and a cluster number corresponding to it are recorded. The similarity is compared with a preset threshold. If the similarity is higher than the threshold, the target pixel is made to belong to the recorded cluster. If the similarity is equal to or lower than the threshold, a new cluster is generated based on the target pixel. This processing is repeatedly executed until all pixels have undergone the processing.

In step S803, cluster integration processing is performed based on the result of clustering processing in step S802. In this processing, first, the target value of the number of areas to be separated is input. In the present invention, for example, the number of colors to be separated can be input as the target value. If the user inputs no target value, a predetermined default value (e.g., 16 colors) may be used as the target value. The current number of clusters is counted. The current number of clusters is compared with the target value of the number of areas. If the current number of clusters is larger than the target value, the clusters are integrated. In the integration processing, feature information indicating the representative value of each cluster (including RGB values for similarity calculation) is obtained. The similarities between the feature information of the clusters are calculated. Two clusters having the highest similarity are integrated into one cluster. The area integration processing is repeatedly executed until the current number of clusters becomes equal to or smaller than the target value.

In steps S804 to S807, noise area reprocessing is executed based on the result of cluster integration processing (area integration processing) in step S803. In this processing, first, in step S804, the area division results are labeled. In step S805, the size of each labeled area is calculated. The size of a labeled area is represented by the number of pixels of the area. If the size of a labeled area is smaller than a predetermined threshold, the area is determined to be a noise area. In step S806, the similarities between each pixel included in the area determined as a noise area and adjacent areas are calculated. The process target pixel is made to belong to the area having the highest similarity (noise removal). In step S807, it is determined whether all labeled areas have been processed. If the processing has not ended yet (NO in step S807), the process returns to step S805 to repeatedly execute the above-described processing until all labeled areas have undergone the processing. On the other hand, if it is determined in step S807 that all labeled areas have undergone the processing (YES in step S807), the clipart area division result is output in step S808.

<Line Drawing Area Color Separation Processing (S317)>

A color line drawing is basically supposed to be able to adopt the same processing as a clipart. However, if noise area reprocessing is performed without modifying the clipart processing, some of lines of the line drawing may be lost. Without noise area reprocessing, a large quantity of noise may remain around lines. To avoid these problems, it is necessary to add processing dedicated to color line drawings based on the clipart processing.

Figure 9:
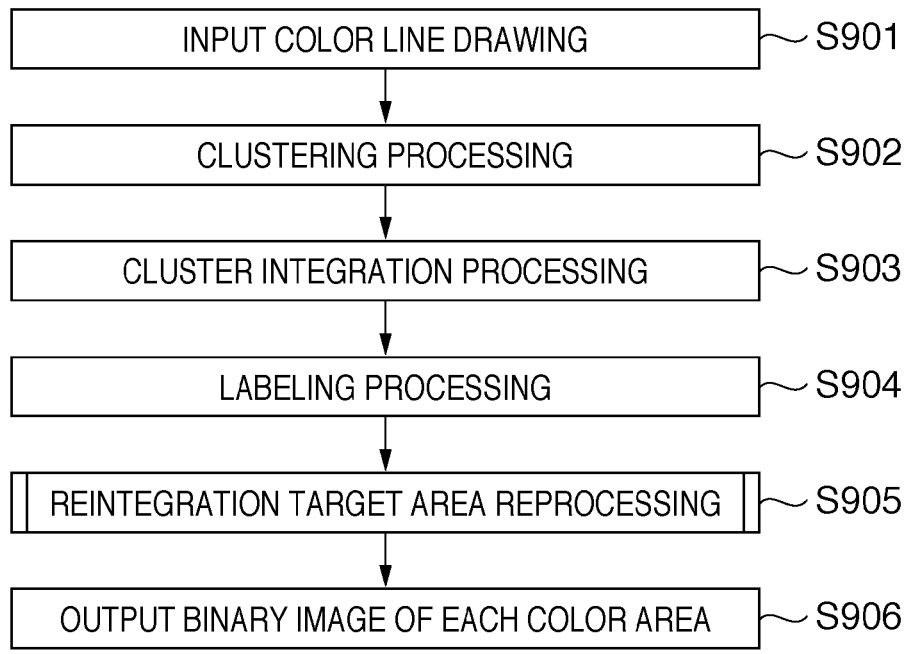
FIG. 9 is a flowchart for explaining line drawing area color separation processing.

Details of the line drawing area color separation processing in step S317 will be described with reference of FIG. 9.

In step S901, a color line drawing image as a process target is input. In step S902, clustering processing is performed based on the color feature amount of each pixel. In step S903, if the number of clusters is larger than the target value, the clusters are integrated in descending order of similarity. In step S904, each cluster after the cluster integration processing is labeled. Steps S902 to S904 are the same as the corresponding processes (S802 to S804) for a clipart.

In step S905, clusters that require reintegration are reintegrated based on connection information (the number of labels) obtained by the labeling processing and representing the number of connected areas included in each of the integrated clusters. The reintegration process target area reprocessing will be described later in detail. In step S906, the binary image of each color area is output.

<Reintegration Process Target Area Reprocessing (S905)>

Figure 10:
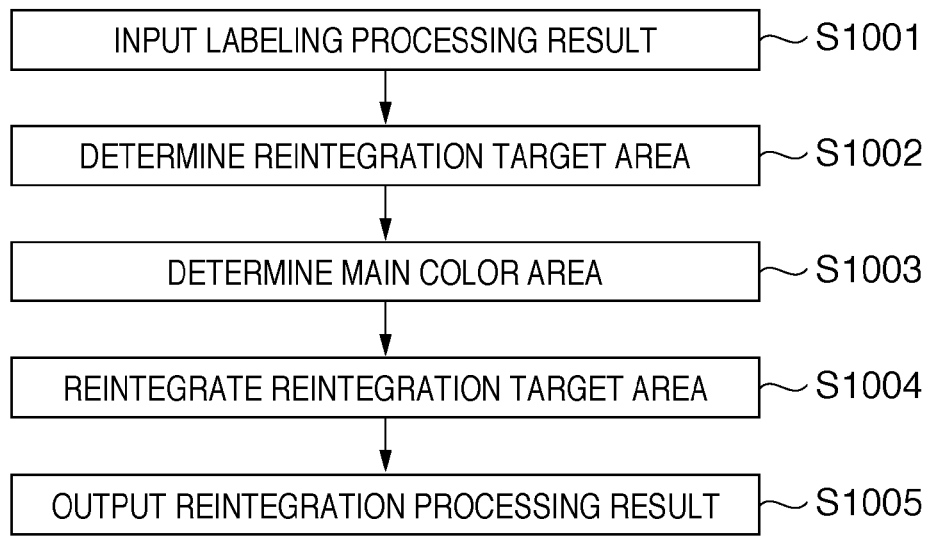
FIG. 10 is a flowchart for explaining reintegration process target area reprocessing in a line drawing area.

The reintegration process target area reprocessing in step S905 of FIG. 9 will be described with reference to FIG. 10.

In step S1001, the result of the labeling processing (S904) is input. In step S1002 or a reintegration process target determination step, a cluster whose number of labels is equal to or larger than a predetermined threshold, and whose number of pixels is smaller than a predetermined threshold is determined to be a reintegration process target cluster (reintegration target area). In step S1003 or a main color area determination step, a cluster whose number of pixels is equal to or larger than a predetermined threshold is determined to be a main color cluster (main color area). In step S1004, each reintegration process target cluster is integrated with the main color cluster having the highest color similarity. In step S1005, the result of reintegration process target cluster reprocessing is output. A cluster whose number of labels is smaller than the predetermined threshold, and whose number of pixels is smaller than the predetermined threshold is neither a reintegration process target cluster nor a main color cluster (cluster of reintegration destination), and is therefore output directly.

The threshold of the number of labels may be an absolute value or the ratio of the number of labels of each cluster to the total number of labels of the entire image. This also applies to the threshold of the number of pixels of clusters. The optimum threshold is supposed to change depending on the image quality of the input image to be processed. For this reason, each threshold to be used for determination can be preferably experimentally obtained in advance using main sample images.

<Example of Line Drawing Area Color Separation Processing (Clustering Processing)>

Figure 11:
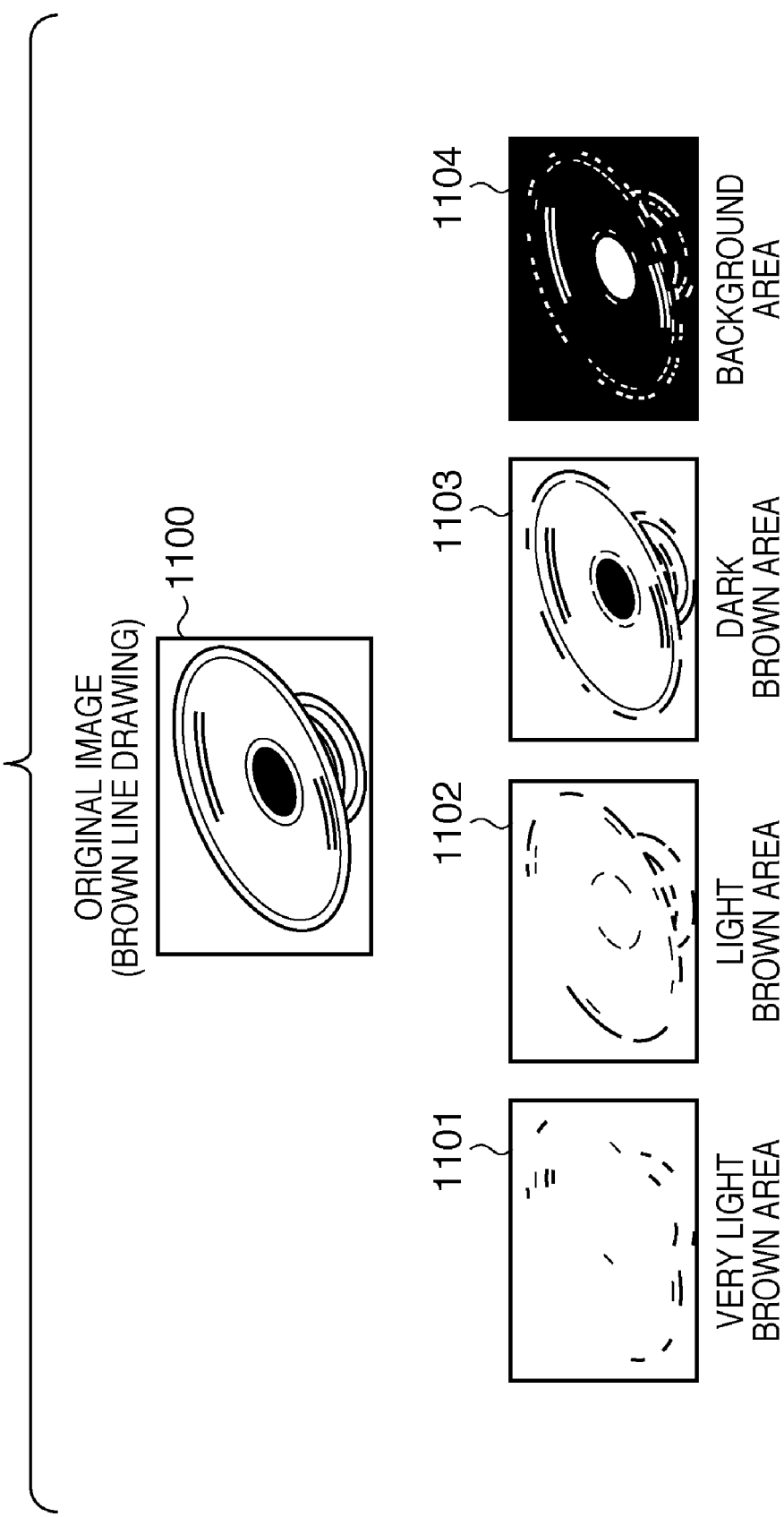
FIG. 11 is a view showing an example of the line drawing area color separation processing (before the reintegration process target area reprocessing)

FIGS. 11 and 12 are views showing examples of line drawing area color separation processing in the image processing according to the first embodiment. FIG. 11 shows the results of clusters before the reintegration process target area reprocessing. For example, an original image 1100 is apparently formed from brown lines. The image of the line drawing area is divided into four clusters, that is, a very light brown area (cluster) 1101, light brown area (cluster) 1102, dark brown area (cluster) 1103, and background area (cluster) 1104 by clustering processing and cluster integration processing. Note that pixel portions belonging to the clusters are expressed by black in the areas 1101 to 1104 in FIG. 11 and areas 1203 and 1204 in FIG. 12. That is, even a line drawing that apparently includes only one color may be divided into a plurality of clusters due to color unevenness or the like upon clustering strictly based on color information. If a line that should be expressed by one cluster breaks upon clustering, the data amount increases in vectorization processing. Additionally, the vector data is unsuitable for reuse.

FIG. 12 shows the results of clusters after the reintegration process target area reprocessing. In the reintegration process target area reprocessing, the clusters 1101 and 1102 (FIG. 11) in each of which the number of labels is equal to or larger than a predetermined threshold, and the number of pixels is smaller than a predetermined threshold are determined to be reintegration process target areas. The clusters 1103 and 1104 in each of which the number of pixels is equal to or larger than the predetermined threshold are determined to be main color areas. The clusters 1101 and 1102 determines as the reintegration process target areas are integrated with, out of the main color areas 1203 and 1204, the main color area 1203 having the highest color similarity.

As described above, according to this embodiment, automatic clipart area/line drawing area determination can be done. This enables to automatically switch the vectorization method in accordance with the attribute of the image.

According to this embodiment, the automatic vectorization method switching improves the process efficiency and image quality of a document image.

According to this embodiment, it is possible to execute color separation processing suitable for the feature of a color line drawing and thus improve the vectorization result of the color line drawing. This improves the compressibility and reusability of a document image.

Second Embodiment

In the above-described first embodiment, the clipart area/line drawing area determination is done using the ratio of the number of pixels having higher edge strengths to the number of pixels other than the background, that is, the edge ratio. In the second embodiment, an arrangement example will be described in which determination is done based on the edge ratio, the number of areas in coarse clustering, and information representing a gray or color image. In this embodiment, an image that satisfies one of the conditions that the edge ratio is high, that the number of areas in coarse clustering is smaller than a predetermined threshold, and that the image is a gray image is determined to be a line drawing.

Figure 13:
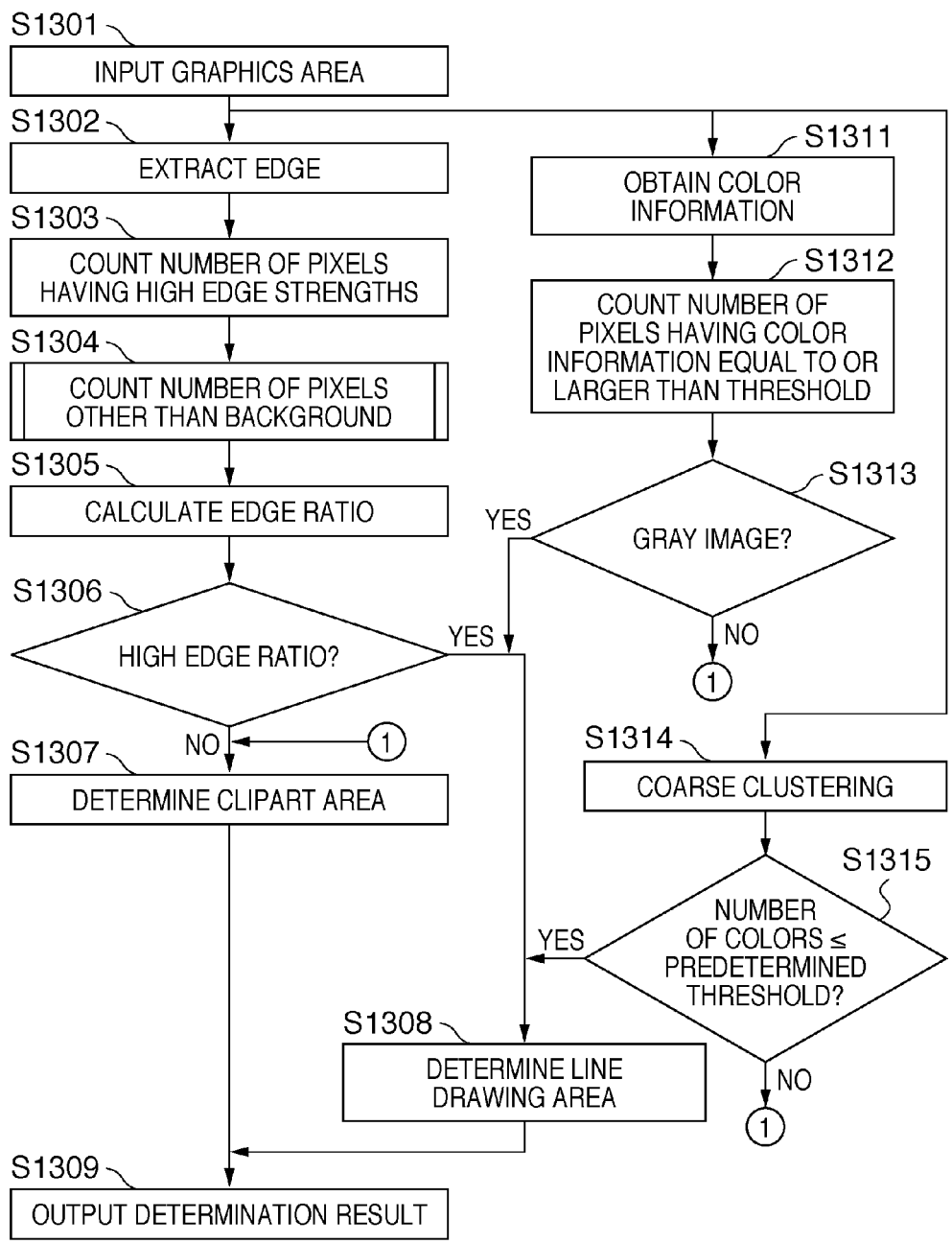
FIG. 13 is a flowchart for explaining clipart area/line drawing area determination processing in image processing according to the second embodiment.

FIG. 13 is a flowchart for explaining clipart area/line drawing area determination processing according to the second embodiment.

In step S1301, a graphics image as a process target is input. In step S1302, an edge is extracted from the image. In step S1303, the number of pixels having edge strengths higher than a predetermined threshold is counted (counted as statistics) based on the edge information. In step S1304, the number of pixels other than the background is counted (counted as statistics). In step S1305, the ratio of the number of pixels having higher edge strengths obtained in step S1303 to the number of pixels other than the background obtained in step S1304, that is, the edge ratio is calculated. The processes up to this point are the same as in the clipart area/line drawing area determination processing of the first embodiment.

In steps S1311 to S1313 or a gray image/color image determination step, whether the input image is a gray image or a color image is determined. In step S1311, for example, color information (S information) such as a chroma is obtained from the RGB color information of each pixel (color information obtaining step). As a method of obtaining color information (S information), for example, the RGB color space is converted into the HSV color space. Note that the present invention is not limited to this example, and any other method capable of obtaining color information (S information) is usable.

In step S1312, the number of pixels having color information (S information) equal to or larger than a predetermined threshold is counted (counted as statistics). In a scan image, the original white portion (the color information (S information) is 0) of the image becomes yellowish. The yellow portion has low color information (S information). A portion whose color information (S information) is equal to or less than the predetermined threshold can be regarded to have no color. In step S1313, the ratio of the number of pixels having color information (S information) equal to or larger than the predetermined threshold to the image size is calculated. If the ratio is lower than a predetermined threshold, the image is determined to be a gray image (YES in step S1313). If the ratio is equal to or higher than the threshold, the image is determined to be a color image (NO in step S1313).

In steps S1314 and S1315 or a color count obtaining step, the approximate number of colors of the image is obtained. In step S1314, the image is coarsely clustered. The coarse clustering processing is fundamentally the same as the clustering processing. However, the threshold of color similarity is set to be high in clustering processing because it aims at obtaining the number of colors by quick clustering. If it is determined in step S1315 that the number of colors is smaller than a predetermined threshold (YES in step S1315), the process advances to step S1308. If the number of colors is equal to or larger than the predetermined threshold (NO in step S1315), the process advances to step S1307.

In steps S1307 and S1308, the type of the graphics image area, that is, whether the graphics area is a clipart area or a line drawing area is determined. If the edge ratio is high, if the image is a gray image, or if the number of colors is smaller than a predetermined threshold, the image is determined to be a line drawing (S1308). That is, if YES in one of steps S1306, S1313, and S1315, the graphics area is determined as a line drawing area.

On the other hand, if the edge ratio is not high (NO in step S1306), if the image is not a gray image (NO in step S1313), or if the number of colors is not smaller than a predetermined threshold (NO in step S1315), the graphics area is determined to be a clipart area. That is, if NO in one of steps S1306, S1313, and S1315, the graphics area is determined as a clipart area. In step S1309, the clipart area/line drawing area determination result is output.

Third Embodiment

In the first embodiment, an arrangement example has been described in which the similarity of color (color similarity) is used for reintegration process target area reprocessing of reintegrating a reintegration process target area with a main color area. In the third embodiment, an arrangement example will be described in which both the color similarity and color information are used for reintegration process target area reprocessing.

Figure 14:
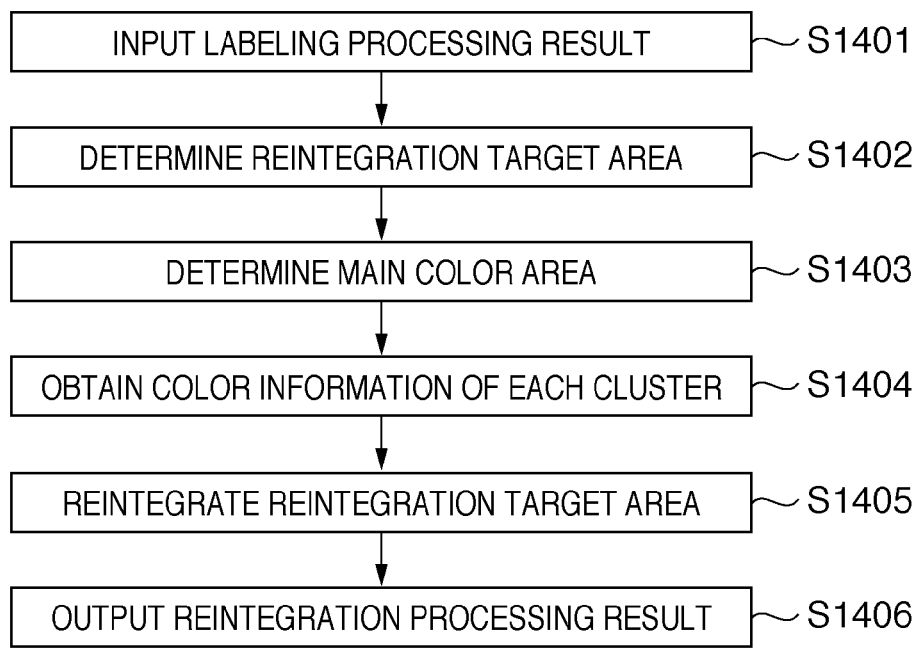
FIG. 14 is a flowchart for explaining reintegration process target area reprocessing of line drawing area color separation processing in image processing according to the third embodiment.

FIG. 14 is a flowchart for explaining reintegration process target area reprocessing of line drawing area color separation processing in image processing according to the third embodiment of the present invention.

In step S1401, a result of labeling processing is input. In step S1402, a cluster whose number of labels is equal to or larger than a predetermined threshold, and whose number of pixels is smaller than a predetermined threshold is determined to be a reintegration process target area. In step S1403, a cluster whose number of pixels is equal to or larger than a predetermined threshold is determined to be a main color area.

In step S1404, the color information of each cluster is obtained. The color information calculation can be done using conversion from the RGB color space into the HSV color space. However, the present invention is not limited to this example, and any other method capable of obtaining color information is usable.

In step S1405, the reintegration process target area is reintegrated with the main color area. As for conditions of reintegration, a reintegration process target area of an achromatic color is integrated with a main color area of an achromatic color having the highest color similarity, and a reintegration process target area of a chromatic color is integrated with a main color area of a chromatic color having the highest color similarity.

In step S1406, the result of reintegration process target cluster reprocessing is output.

Fourth Embodiment

In the first embodiment, the line drawing area color separation processing has been described in the sequence of clustering processing, cluster integration processing, labeling processing, and reintegration target area reprocessing. In the fourth embodiment, improved processing of further appropriately eliminating small areas will be explained.

Figure 15:
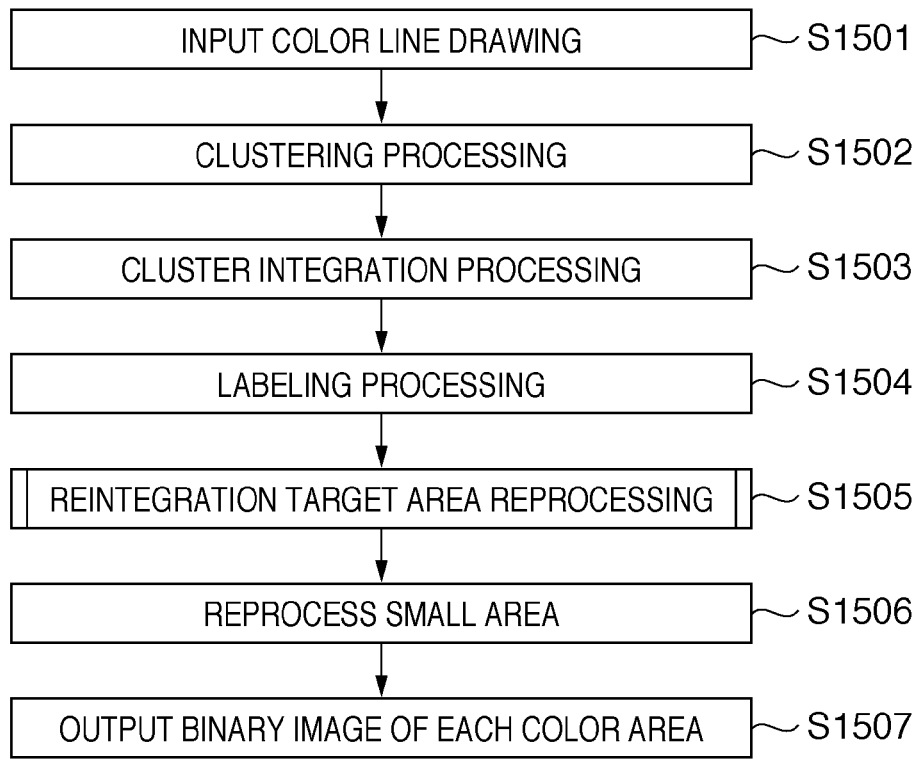
FIG. 15 is a flowchart for explaining line drawing area color separation processing in image processing according to the fourth embodiment.

FIG. 15 is a flowchart for explaining line drawing area color separation processing according to the fourth embodiment. In step S1501, a color line drawing image as a process target is input.

In step S1502, clustering processing is performed. In step S1503, cluster integration processing is performed. In step S1504, labeling processing is performed. In step S1505, areas that require reintegration are reintegrated based on connection information obtained by the labeling processing.

In step S1506, a small area is reprocessed. In this processing, if the number of pixels of a labeled area that is formed by labeling the result of reintegration target area reprocessing is smaller than a predetermined threshold, the labeled area is determined to be a small area. All pixels of the small area are redistributed to one of neighboring areas which has the highest color similarity. In step S1507, the binary image of each color area is output.

Fifth Embodiment

In the first to fourth embodiments, after area separation of an input image, a graphics area having an attribute other than text, photo, and table attributes is determined to be a clipart area or a line drawing area. An area determined to be a line drawing area upon the determination undergoes line drawing color separation processing and line drawing vectorization processing. An area determined to be a clipart area undergoes clipart area division and clipart vectorization processing.

In the fifth embodiment, an application example of color separation processing of an area having a line drawing attribute will be described.

Figure 16:
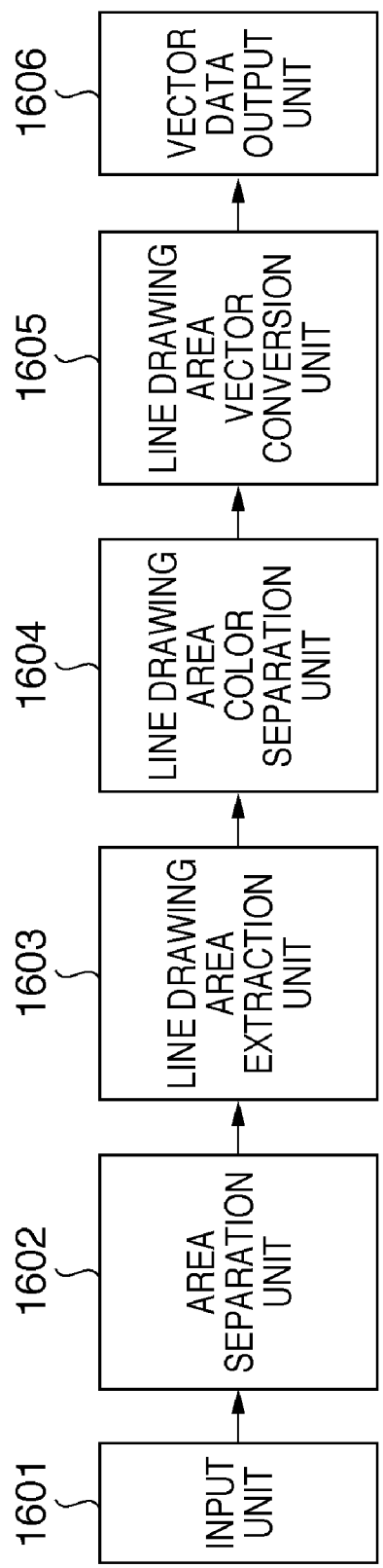
FIG. 16 is a block diagram showing the arrangement of an image processing apparatus having a function of performing color separation processing for line drawing vectorization processing according to the fifth embodiment.

FIG. 16 is a block diagram showing the arrangement of an image processing apparatus having a function of performing color separation processing for line drawing vectorization processing according to the fifth embodiment. Referring to FIG. 16, an input unit 1610 inputs paper information as a color image by scanning. An area separation unit 1602 separates the color image into a plurality of kinds of areas including text and photo areas. A line drawing area extraction unit 1603 extracts line drawing areas from the separated areas. A line drawing area color separation unit 1604 separates a line drawing area into color components. A line drawing area vector conversion unit 1605 converts the line drawing area color separation result into vector data. A vector data output unit 1606 outputs the output result of the line drawing area vector conversion unit 1605.

Figure 17:
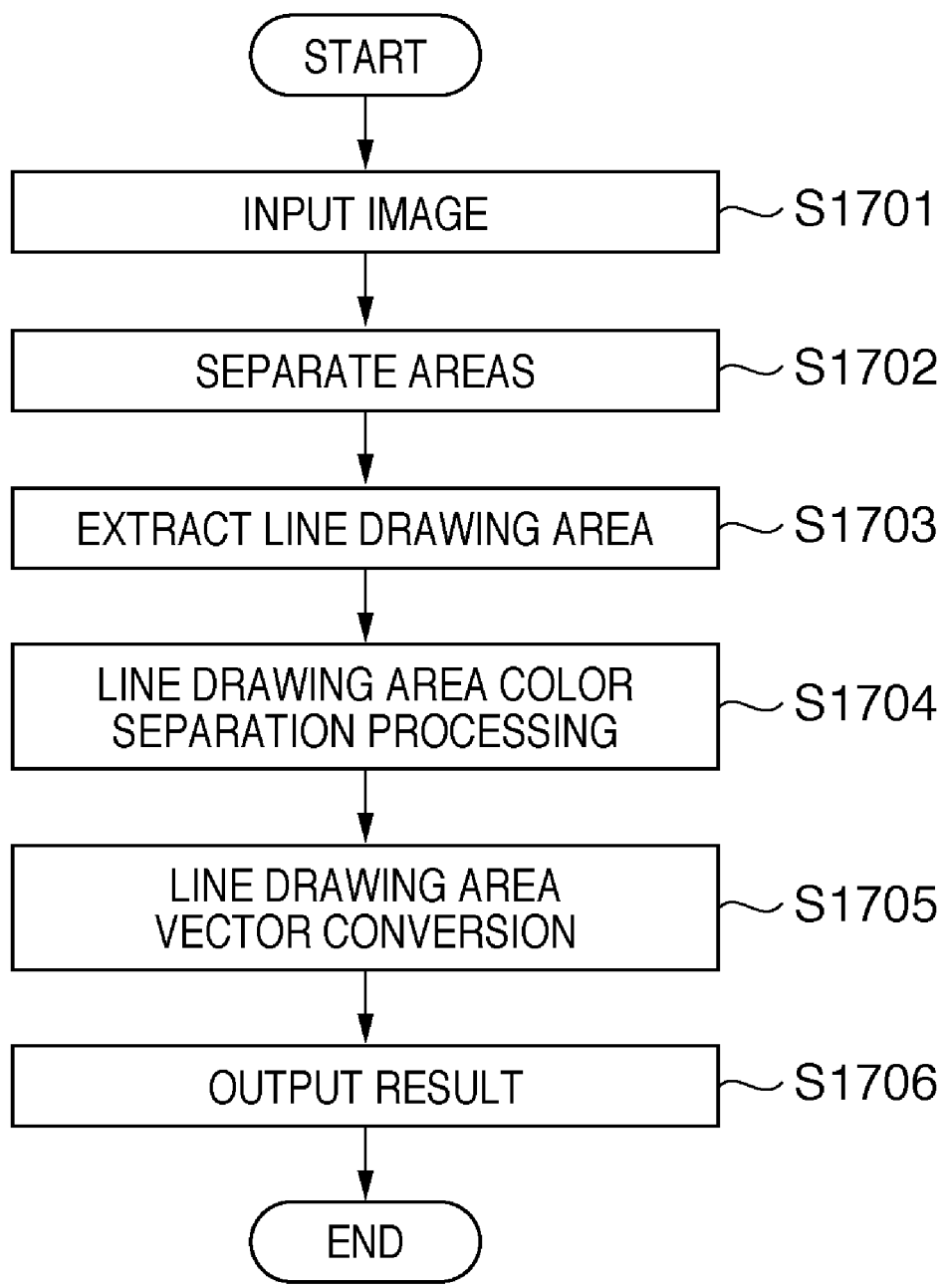
FIG. 17 is a flowchart for explaining an outline of the line drawing vectorization processing according to the fifth embodiment.

FIG. 17 is a flowchart for explaining the sequence of the line drawing vectorization processing according to the fifth embodiment.

First, the input unit 1601 receives paper information from a scanner, thereby obtaining color document image data (step S1701). The area separation unit 1602 converts the received color document image into binary data, and separates the binary image data into a plurality of kinds of areas such as text, photo, and table areas (step S1702). The line drawing area extraction unit 1603 selects an area having a line drawing attribute from the areas separated in the preceding step as a process target (step S1703). For example, the user is caused to designate a line drawing area, and the line drawing area extraction unit 1603 selects the designated area as a line drawing area.

The line drawing area color separation unit 1604 separates the line drawing area into color areas based on information such as the color features of pixels and connection of the areas (step S1704). The line drawing area vector conversion unit 1605 converts each separated color area into vector data (step S1705). Then, the vector data output unit 1606 outputs the vectorization result (step S1706).

Line drawing area color separation processing, or reintegration target area reprocessing associated with the line drawing area color separation processing can be done using one of the first, third, and fourth embodiments.

As described above, according to this embodiment, it is possible to apply the above-described line drawing area color separation processing (cluster reintegration processing) to a line drawing area determined by another method.

According to this embodiment, automatic vectorization method switching improves the process efficiency and image quality of a document image.

Additionally, according to this embodiment, it is possible to execute color separation processing suitable for the feature of a color line drawing and thus improve the vectorization result of the color line drawing. This improves the compressibility and reusability of a document image.

Sixth Embodiment

Figure 18:
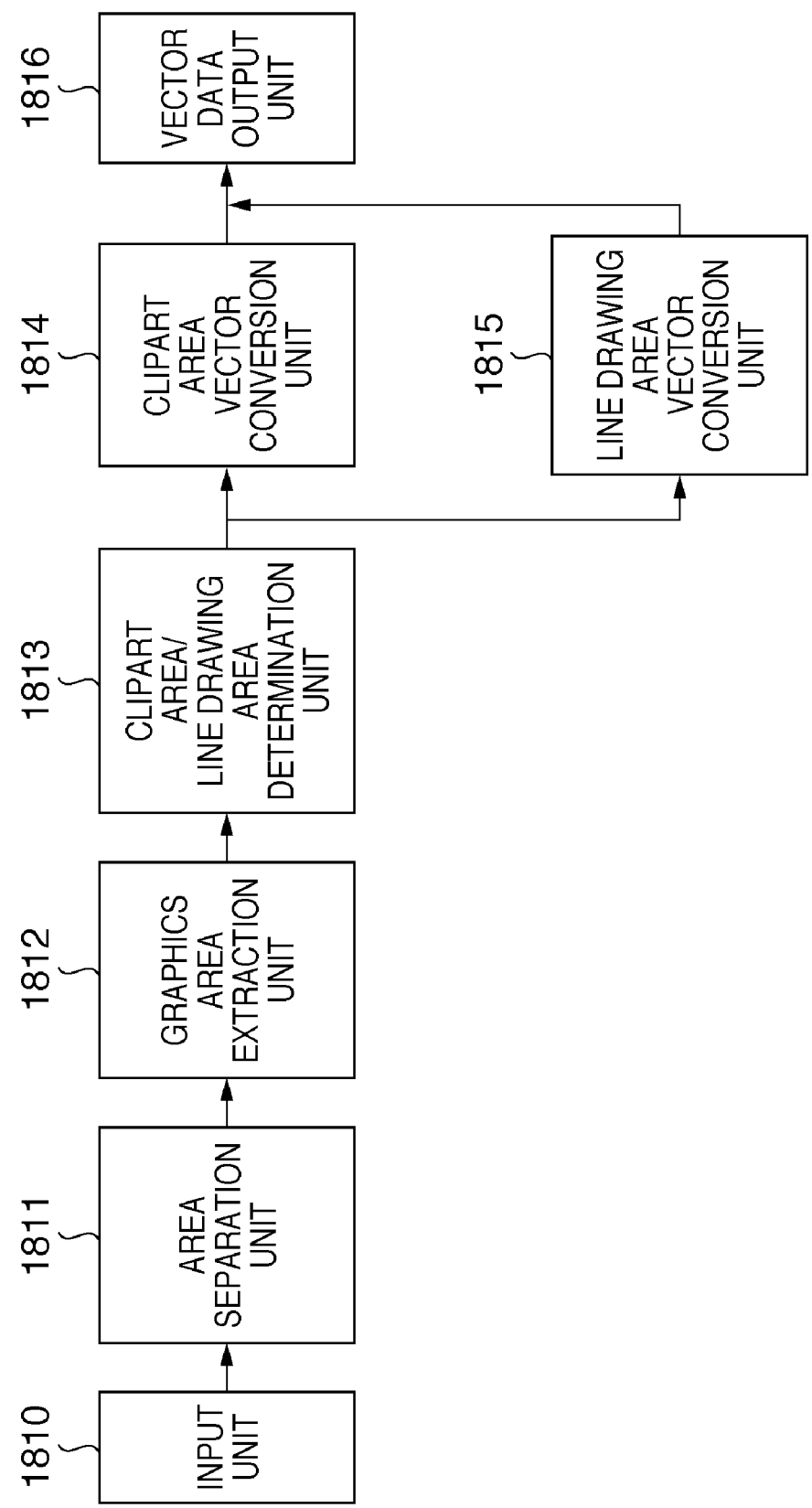
FIG. 18 is a block diagram showing the functional arrangement of an image processing apparatus according to the sixth embodiment.

FIG. 18 is a block diagram showing the arrangement of an image processing apparatus according to the sixth embodiment of the present invention. The image processing apparatus has functions of performing automatic vectorization switching processing by automatic clipart area/line drawing area determination, and performing color separation processing for color line drawing vectorization processing.

Referring to FIG. 18, an input unit 1810 inputs paper information as a color image by scanning. An area separation unit 1811 separates the color image into a plurality of kinds of areas including text and photo areas. A graphics area extraction unit 1812 extracts, from the separated areas, graphics areas having attributes other than text and photo attributes. A clipart area/line drawing area determination unit 1813 determines clipart areas and line drawing areas included in the graphics areas. A clipart area vector conversion unit 1814 converts the clipart area into vector data. A line drawing area vector conversion unit 1815 converts the line drawing area into vector data. A vector data output unit 1816 can output the process result of the clipart area vector conversion unit 1814 and that of the line drawing area vector conversion unit 1815. The arrangement of the main part of a digital multifunction peripheral (MFP) as an embodiment that implements the image processing apparatus shown in FIG. 18 is the same as that in the block diagram (FIG. 2) described in the first embodiment, and a description thereof will not be repeated in the sixth embodiment.

<Outline of Automatic Vectorization Switching Processing by Automatic Clipart Area/Line Drawing Area Determination>

Figure 19:
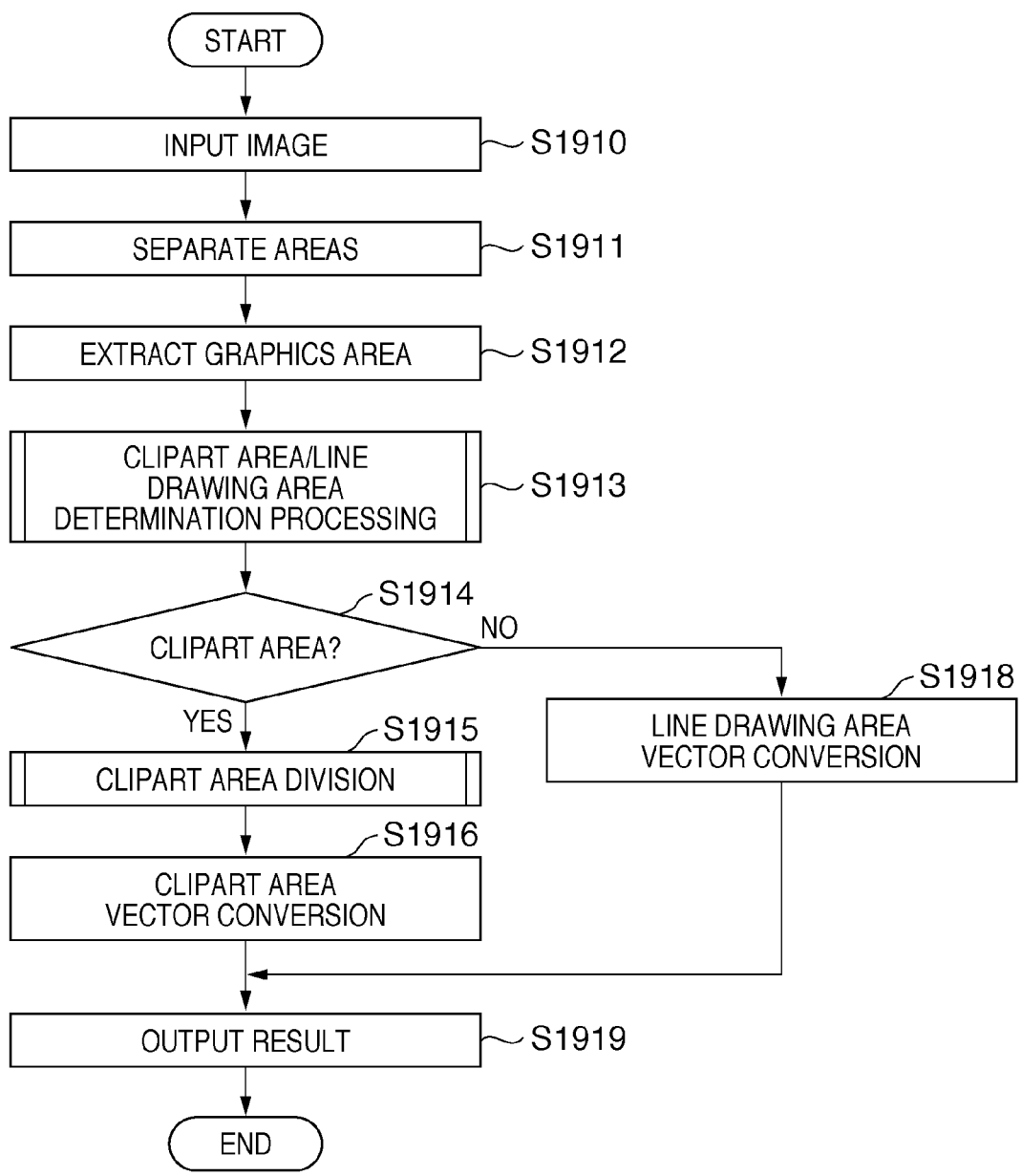
FIG. 19 is a flowchart for explaining an outline of automatic vectorization switching processing by automatic clipart area/line drawing area determination according to the sixth embodiment.

FIG. 19 is a flowchart for explaining an outline of automatic vectorization switching processing by automatic clipart area/line drawing area determination according to the sixth embodiment.

First, the input unit 1810 receives paper information from a scanner, thereby obtaining color document image data (step S1910). The area separation unit 1811 converts the received color document image into binary data, and separates the binary image data into a plurality of kinds of areas such as text, photo, and table areas (step S1911). The area separation processing can be implemented using, for example, an area separation technique described in U.S. Pat. No. 5,680,478. Note that this patent describes "Method and Apparatus for Character Recognition (Shin-Ywan Wang et al./Canon K. K.)". The graphics area extraction unit 1812 selects, from the areas separated in the preceding step, a graphics area having an attribute other than text and photo attributes, that is, an area including a clipart area or a line drawing area as a process target (step S1912).

The clipart area/line drawing area determination unit 1813 determines whether the graphics area extracted in the preceding step (step S1912) is a clipart area or a line drawing area (step S1913). The clipart area/line drawing area determination processing is the same as in step S313 described in the first embodiment and in the flowchart of FIG. 5 which explains the contents of step S313 in detail. The statistical processing of counting the number of pixels other than the background (S504) in the flowchart of FIG. 5 and the contents of the flowchart of FIG. 6 which explains the contents of step S504 in detail are the same as those described in the first embodiment.

Upon determining that the graphics area is a clipart area (YES in step S1914), the clipart area vector conversion unit 1814 divides the pixels into several clusters (areas) based on color features (step S1915). The area division processing in step S1915 is the same as in the flowchart of FIG. 8 described in the first embodiment. The clipart area vector conversion unit 1814 converts each divided area into vector data based on the contour and the color in the area (step S1916). The vectorization processing is implemented by, for example, a technique described in T10024542 which extracts the boundary line of each color area, tracks the contour of each boundary line, and selects its coordinate vector. The vectorization processing of this embodiment also uses the technique.

Upon determining that the graphics area is a line drawing area (NO in step S1914), the line drawing area vector conversion unit 1815 converts the data of the line drawing area into vector data (step S1918). The vectorization processing is implemented using, for example, a technique described in Japanese Patent No. 2885999 which tracks the contour of a binary image and selects its coordinate vector.

Then, the vector data output unit 1816 outputs the vectorization result (step S1919).

Other Embodiments

The objects of the present invention are also achieved by supplying a computer-readable storage medium which records software program codes to implement the functions of the above-described embodiments to a system or apparatus. The objects are also implemented by causing the computer (or CPU or MPU) of the system or apparatus to read out and execute the program codes stored in the storage medium.

In this case, the program codes themselves read out from the storage medium implement the functions of the above-described embodiments. The storage medium that stores the program codes constitutes the present invention.

Examples of the storage medium to supply the program codes are a flexible disk, hard disk, optical disk, magnetooptical disk, CD-ROM, CD-R, nonvolatile memory card, and ROM.

The functions of the above-described embodiments are implemented by causing the computer to execute the readout program codes. The present invention also incorporates a case in which the OS (Operating System) running on the computer partially or wholly executes actual processing based on the instructions of the program codes, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-143617, filed May 30, 2008, which is hereby incorporated by reference herein in its entirety.

What is claimed is:

1. An image processing apparatus comprising:
a separation unit adapted to determine an attribute of data contained in input document image data and separating the document image data into areas by attributes;
an extraction unit adapted to extract, from the separated areas, an area of a graphics image as a target of vectorization processing;
an edge pixel count unit adapted to extract an edge strength of each pixel of the area of the graphics image, and count the number of pixels having the edge strength higher than a predetermined first threshold;
an identification unit adapted to divide the area of the graphics image into color clusters based on color information of pixels of the area of the graphics image, and identify a background area and an area other than the background area based on the color clusters to which pixels of four surrounding sides belong;
a pixel-except-background count unit adapted to count the number of pixels included in the area other than the background area identified by said identification unit;
an edge ratio calculation unit adapted to calculate an edge ratio representing a ratio of the number of pixels counted by said edge pixel count unit to the number of pixels included in the area other than the background area counted by said pixel-except-background counting unit;
a determination unit adapted to determine that an attribute of the area of the graphics image is a clipart area when the edge ratio is not more than a predetermined second threshold, and is a line drawing area including a line drawing when the edge ratio is more than the predetermined second threshold; and
a vector conversion unit adapted to perform vectorization processing corresponding to the attribute of the graphics image based on a determination result of said determination unit.

2. The apparatus according to claim 1, wherein:
said vector conversion unit comprises:
a clipart area vector conversion unit adapted to vectorize data included in the clipart area; and
a line drawing area vector conversion unit adapted to vectorize data included in the line drawing area, and
said vector conversion unit switches between said clipart area vector conversion unit and said line drawing area vector conversion unit in accordance with the attribute of the graphics image.

3. The apparatus according to claim 2, wherein:
said clipart area vector conversion unit comprises:
a clustering processing unit adapted to separate the clipart area into clusters based on similarities of colors of pixels of the clipart area;
a cluster integration unit adapted to integrate the clusters based on similarity of a representative color; and
a noise removal unit adapted to, if the number of pixels included in the integrated cluster is smaller than a predetermined threshold, remove the integrated cluster as a noise area, and
said clipart area vector conversion unit performs the vectorization processing for the clipart area from which the noise area has been removed by said nose removal unit.

4. The apparatus according to claim 2, wherein:
said line drawing area vector conversion unit comprises:
a clustering processing unit adapted to separate the line drawing area into a plurality of clusters based on feature information of pixels of the line drawing area;
a cluster integration unit adapted to integrate similar clusters based on similarities of feature information of the plurality of clusters;
a labeling processing unit adapted to obtain the number of connected areas included in each cluster integrated by said cluster integration unit;

a reintegration process target determination unit adapted to determine, as a reintegration target cluster that requires further integration, the cluster integrated by said cluster integration unit in which the number of connected areas is not less than a predetermined threshold, and the number of pixels is smaller than a predetermined threshold;

a main color area determination unit adapted to determine, as main color clusters, the cluster integrated by said cluster integration unit in which the number of pixels is not less than a predetermined threshold; and a reintegration unit adapted to integrate the reintegration target cluster with one of the main color clusters based on the feature information of each cluster, and said line drawing area vector conversion unit performs the vectorization processing based on the cluster integrated by said reintegration unit.

5. The apparatus according to claim 1, wherein:

said determination unit further comprises a gray image/color image determination unit adapted to determine whether the graphics image is a gray image or a color image, and if the graphics image is determined to be a gray image, said determination unit determines the area of the graphics image as a line drawing area, and if the graphics image is determined to be a color image, said determination unit determines the area of the graphics image as a clipart area.

6. The apparatus according to claim 5, wherein:

said gray image/color image determination unit comprises:
- a color information obtaining unit adapted to obtain the color information of each pixel of the graphics image; and
- a pixel-not-less-than-threshold count unit adapted to count the number of pixels each having color information not less than a predetermined threshold, and said gray image/color image determination unit calculates a ratio of the number of pixels each having the color information not less than the predetermined threshold to a size of the area of the graphics image, if the ratio is not less than a predetermined threshold, determines the graphics image as a color image, and if the ratio is lower than the predetermined threshold, determines the graphics image as a gray image.

7. The apparatus according to claim 1, wherein:

said determination unit further comprises a color count obtaining unit adapted to obtain the number of colors included in the graphics image based on the color information of the pixels of the area of the graphics image, and if the number of colors is smaller than a predetermined threshold, said determination unit determines the area of the graphics image as a line drawing area, and if the number of colors is not less than the predetermined threshold, said determination unit determines the area of the graphics image as a clipart area.

8. An image processing method of an image processing apparatus, the method comprising:

a separating step of determining an attribute of data contained in input document image data and separating the document image data into areas corresponding to attributes;

an extracting step of extracting, from each of the separated areas, an area of a graphics image as a target of vectorization processing;

an edge pixel counting step of extracting an edge strength of each pixel of the area of the graphics image, and counting the number of pixels having the edge strength higher than a predetermined first threshold;

an identifying step of dividing the area of the graphics image into color clusters based on color information of pixels of the area of the graphics image, and identifying a background area and an area other than the background area based on the color clusters to which pixels of four surrounding sides belong;

a pixel-except-background counting step of counting the number of pixels included in the area other than the background area identified in the identifying step;

an edge ratio calculation step of calculating an edge ratio representing a ratio of the number of pixels counted in the edge pixel counting step to the number of pixels included in the area other than the background area counted in the pixel-except-background counting step;

a determining step of determining that an attribute of the area of the graphics image is a clipart area when the edge ratio is not more than a predetermined second threshold and a line drawing area including a line drawing when the edge ratio is more than the predetermined second threshold; and a vector converting step of performing vectorization processing corresponding to the attribute of the graphics image based on a determination result in the determining step.

9. The method according to claim 8, wherein:

the vector converting step comprises:
- a clipart area vector converting step of vectorizing data included in the clipart area; and
- a line drawing area vector converting step of vectorizing data included in the line drawing area, and the vector converting step switches between the clipart area vector converting step and the line drawing area vector converting step in accordance with the attribute of the graphics image.

10. The method according to claim 9, wherein:

the clipart area vector converting step comprises:
- a cluster separating step of separating the clipart area into clusters based on similarities of feature information of pixels of the clipart area;
- a cluster integrating step of integrating similar clusters into one cluster based on similarity of representative feature information of the clusters; and
- a noise removing step of, if the number of pixels included in the integrated cluster is smaller than a predetermined threshold, removing the integrated cluster as a noise area, and the clipart area vector converting step performs the vectorization processing for the clipart area from which the noise area has been removed in the noise removing step.

11. The method according to claim 9, wherein:

the line drawing area vector converting step comprises:
- a clustering processing step of separating the line drawing area into a plurality of clusters based on feature information of pixels of the line drawing area;
- a cluster integrating step of integrating similar clusters based on similarities of feature information of the plurality of clusters;
- a label processing step of obtaining the number of connected areas included in each cluster integrated in the cluster integrating step;
- a reintegration process target determining step of determining, as a reintegration target cluster that requires further integration, the cluster integrated in the cluster integrating step in which the number of connected areas is not less than a predetermined threshold, and the number of pixels is smaller than a predetermined threshold;

a main color determining step of determining, as main color clusters, the cluster integrated in the cluster integrating unit in which the number of pixels is not less than a predetermined threshold; and a reintegrating step of integrating the reintegration target cluster with one of the main color clusters based on the feature information of each cluster, and the line drawing area vector converting step performs the vectorization processing based on the cluster integrated in the reintegration step.

12. The method according to claim 8, wherein:

the determining step further comprises a gray image/color determining step of determining whether the graphics image is a gray image or a color image, and if the graphics image is determined to be a gray image, the determining step determines the area of the graphics image as a line drawing area, and if the graphics image is determined to be a color image, the determining step determines the area of the graphics image as a clipart area.

13. The method according to claim 12, wherein:

the gray image/color determining step comprises:

a color information obtaining step of obtaining the color information of each pixel of the graphics image; and a pixel-not-less than threshold counting step of counting the number of pixels each having color information not less than a predetermined threshold, and the gray image/color determining step calculates a ratio of the number of pixels each having the color information not less than the predetermined threshold to a size of the area of the graphics image, if the ratio is not less than a predetermined threshold, determines the graphics image as a color image, and if the ratio is lower than the predetermined threshold, determines the graphics image as a gray image.

14. The method according to claim 8, wherein:

the determining step further comprises a color count obtaining step of obtaining the number of colors included in the graphics image based on the color information of the pixels of the area of the graphics image, and if the number of colors is smaller than a predetermined threshold, the determining step determines the area of the graphics image as a line drawing area, and if the number of colors is not less than the predetermined threshold, the determining step determines the area of the graphics image as a clipart area.

15. A non-transitory computer-readable storage medium storing a program executable by a computer to execute an image processing method comprising the steps of:

a separating step of determining an attribute of data contained in input document image data and separating the document image data into areas corresponding to attributes;

an extracting step of extracting, from each of the separated areas, an area of a graphics image as a target of vectorization processing;

an edge pixel counting step of extracting an edge strength of each pixel of the area of the graphics image, and counting the number of pixels having the edge strength higher than a predetermined first threshold;

an identifying step of dividing the area of the graphics image into color clusters based on color information of pixels of the area of the graphics image, and identifying a background area and an area other than the background area based on the color clusters to which pixels of four surrounding sides belong;

a pixel-except-background counting step of counting the number of pixels included in the area other than the background area identified in the identifying step;

an edge ratio calculation step of calculating an edge ratio representing a ratio of the number of pixels counted in the edge pixel counting step to the number of pixels included in the area other than the background area counted in the pixel-except-background counting step;

a determining step of determining that an attribute of the area of the graphics image is a clipart area when the edge ratio is not more than a predetermined second threshold and a line drawing area including a line drawing when the edge ratio is more than the predetermined second threshold; and a vector converting step of performing vectorization processing corresponding to the attribute of the graphics image based on a determination result in the determining step.

* * * * *